United States Patent
Luo et al.

(10) Patent No.: US 12,228,718 B2
(45) Date of Patent: Feb. 18, 2025

(54) SYSTEM FOR QUANTITATIVE DIFFERENTIAL PHASE CONTRAST MICROSCOPY WITH ISOTROPIC TRANSFER FUNCTION

(71) Applicants: NATIONAL TAIWAN UNIVERSITY, Taipei (TW); YONGLIN HEALTHCARE FOUNDATION, New Taipei (TW)

(72) Inventors: Yuan Luo, New Taipei (TW); Yu-Hsuan Chuang, New Taipei (TW); Yu-Zi Lin, New Taipei (TW)

(73) Assignees: NATIONAL TAIWAN UNIVERSITY, Taipei (TW); YONGLIN HEALTHCARE FOUNDATION, New Taipei (TW)

( * ) Notice: Subject to any disclaimer, the term of this patent is extended or adjusted under 35 U.S.C. 154(b) by 19 days.

(21) Appl. No.: 18/121,979

(22) Filed: Mar. 15, 2023

(65) Prior Publication Data
US 2023/0236404 A1    Jul. 27, 2023

Related U.S. Application Data

(62) Division of application No. 16/726,786, filed on Dec. 24, 2019, now Pat. No. 11,624,900.

(51) Int. Cl.
| | |
|---|---|
| G02B 21/00 | (2006.01) |
| G02B 21/06 | (2006.01) |
| G02B 21/14 | (2006.01) |
| G02B 21/34 | (2006.01) |

(52) U.S. Cl.
CPC ......... G02B 21/14 (2013.01); G02B 21/0052 (2013.01); G02B 21/34 (2013.01)

(58) Field of Classification Search
CPC .............. G02B 21/00; G02B 21/0004; G02B 21/0016; G02B 21/0028; G02B 21/0032; G02B 21/0052; G02B 21/0056; G02B 21/006; G02B 21/008; G02B 21/06; G02B 21/08; G02B 21/14; G02B 21/36; G02B 21/361; G02B 21/368
USPC .................................................. 359/368–398
See application file for complete search history.

(56) References Cited

U.S. PATENT DOCUMENTS

| | | | |
|---|---|---|---|
| 9,599,808 B2 * | 3/2017 | Fukutake | G02B 21/365 |
| 2021/0311294 A1 * | 10/2021 | Hayashi | G02B 21/06 |

* cited by examiner

*Primary Examiner* — Thong Q Nguyen
(74) *Attorney, Agent, or Firm* — ScienBiziP, P.C.

(57) ABSTRACT

A system for quantitative differential phase contrast microscopy with isotropic transfer function utilizes a modulation mechanism to create a detection light field having a radial or other axial orientation of optical intensity gradient or other distribution. A condenser generates an off-axis light field to project onto an object under examination, thereby generating an object light field, which is then guided to an image capturing device through an objective lens for capturing images. A differential phase contrast algorithm is applied to the images for obtaining a phase, thereby a depth information corresponding to the phase can be obtained to reconstruct the surface profile of the object.

4 Claims, 31 Drawing Sheets
(23 of 31 Drawing Sheet(s) Filed in Color)

SYSTEM FOR QUANTITATIVE DIFFERENTIAL PHASE CONTRAST MICROSCOPY WITH ISOTROPIC TRANSFER FUNCTION

CROSS-REFERENCE TO RELATED APPLICATIONS

This application is a divisional application of U.S. application Ser. No. 16/726,786, now U.S. Pat. No. 11,624,900 filed on Dec. 24, 2019.

FIELD

The subject matter herein general relates to microscopy techniques, and particularly relates to a system for quantitative differential phase contrast microscopy with isotropic transfer function, which utilizes a light field having a gradient distribution for off-axis illumination to obtain an image of an object for phase measurement.

BACKGROUND

If contrast is poor, many objects observable for biological or other scientific purpose have weak phase features, which are difficult to observe without an application of staining. In a conventional technique, these weak phase objects can be visually observed in a phase imaging system and using a spatial rate wave. However, phase measurement using a phase contrast microscopy system cannot be quantitative, because phase information in the image cannot be directly separated from intensity information. Therefore, one of the common methods for quantizing phase information measurement is to take measurements using an interference technique. However, an interference technique requires a high coherent illumination with a spot noise effect, and is limited by a spatial resolution.

Another type of quantitative phase imaging technique is a differential phase contrast (DPC) microscopy system, which produces a better resolution for solving the conventional interference shortcomings. In the conventional DPC system, a weak object transfer function is used to separate the phase information from the intensity information, and then quantize the phase information through paired images.

In a typical DPC architecture utilizing a visible light source for detection, a semicircular pattern is used to modulate the light source. The semicircular pattern, as shown in FIG. 1A, can modulate using a light intensity mask or a programmable LED array. Another method is to generate a detection light by using a spatial light modulator (SLM) or a liquid crystal panel. The SLM is positioned on a Fourier plane of an objective lens. A spectral modulation of the light intensity mask for the semicircular pattern utilizes a Hilbert transform. This Hilbert transform technique has been demonstrated to have an ability to obtain a phase having an isotropic phase contrast response, under conditions of a coherent laser illumination and setting the SLM on the Fourier plane of the objective lens.

In conventional techniques, biaxial semicircles shown in FIGS. 1A and 1B are used for measurement. However, under a partially coherent illumination, the DPC transfer function, under the semicircular light intensity mask using a vertical axis and a horizontal axis, will cause a non-isotropic transfer function due to spectrum being incomplete. To solve this problem, as shown in FIG. 1C, it is necessary to carry out the measurement using light intensity masks 00-11 for a change of twelve axial directions to increase a stability and accuracy in a phase reduction calculation. Additionally, since the semicircular light intensity mask requires a light intensity change for twelve axial directions, an efficiency of the measurement is greatly reduced, which is disadvantageous for a detection on a production line.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

The patent or application file contains at least one drawing executed in color. Copies of this patent or patent application publication with color drawing(s) will be provided by the Office upon request and payment of the necessary fee.

DETAILED DESCRIPTION

Figure 1C:
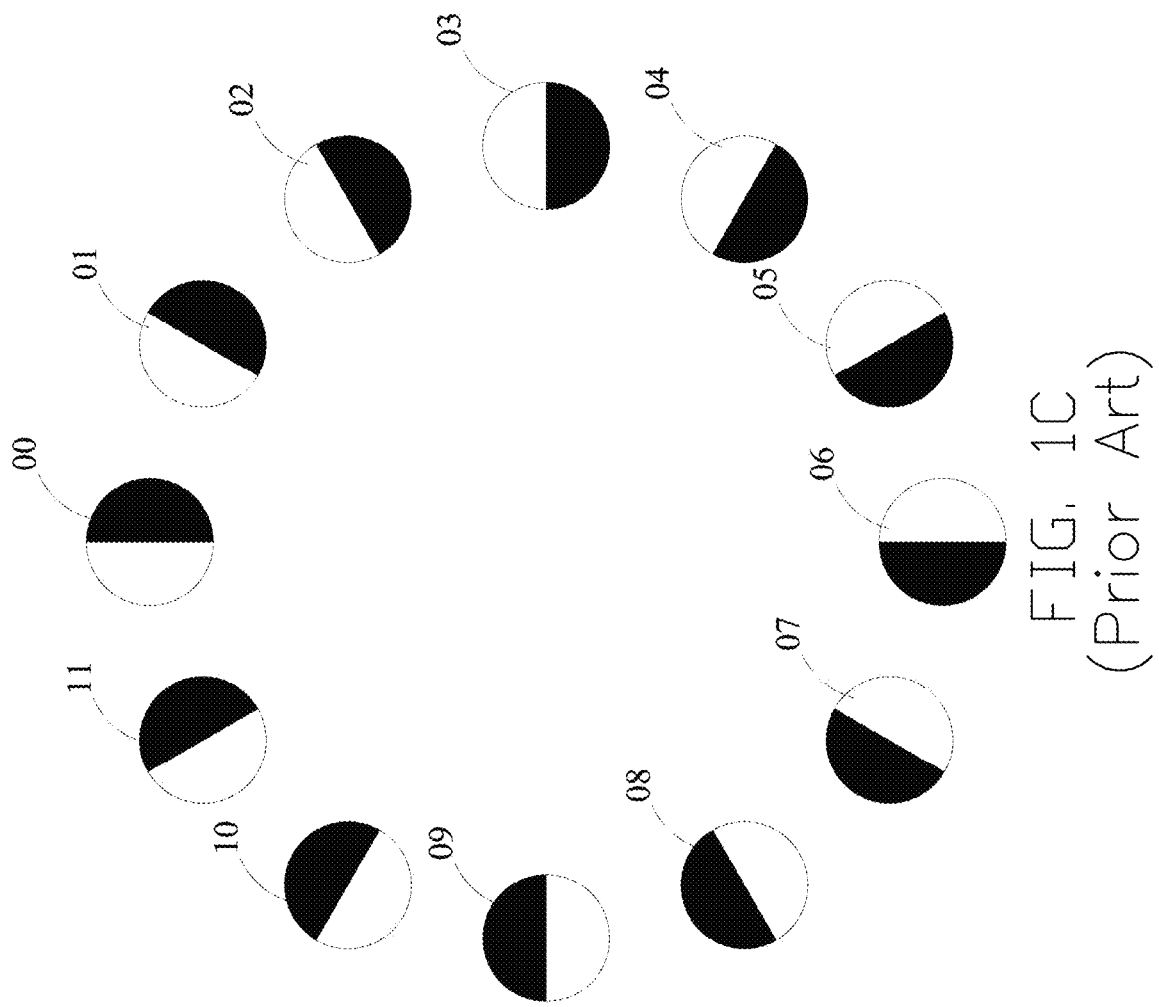
FIG. 1A, FIG. 1B, and FIG. 1C are schematic views of conventional light masks, which are changed with different axis directions.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2A:
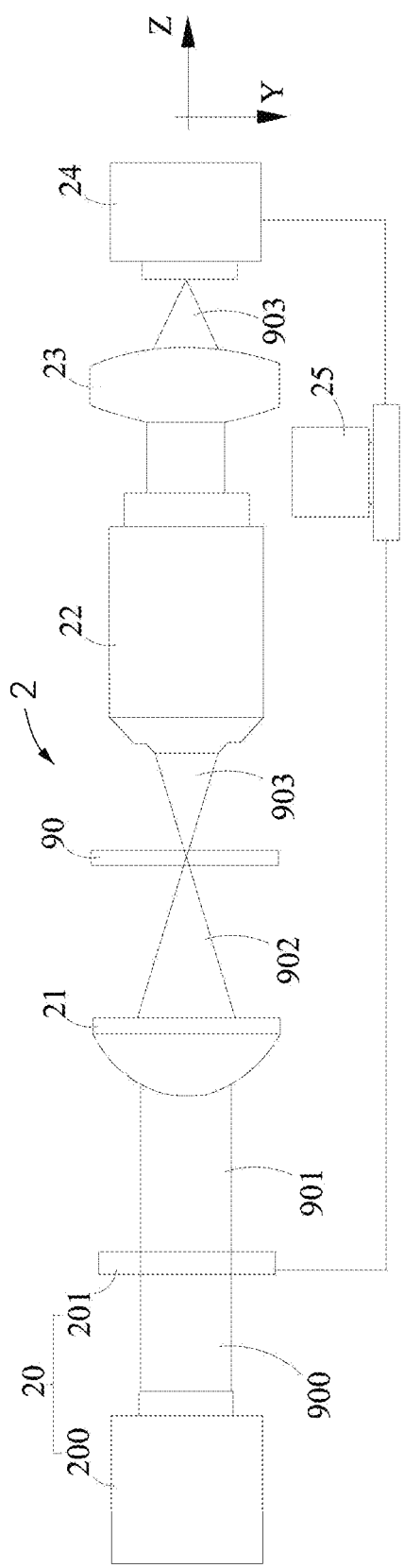
FIG. 2A is an optical architecture diagram of a system for quantitative differential phase contrast microscopy with an isotropic transfer function according to an embodiment of the present disclosure.

FIG. 2A illustrates an optical architecture diagram of a system for quantitative differential phase contrast microscopy with an isotropic transfer function according to an embodiment of the present disclosure. In this embodiment, the microscopy system 2 includes a light source module 20, a condenser 21, an objective lens 22, an image capturing module 24, and an operation processing unit 25. In this embodiment, the light source module 20 includes a broadband source 200 and a light intensity modulator 201. The broadband source 200 is used to generate an incident light field 900. In this embodiment, the incident light field 900 is a broadband light, for example, a white light.

The light intensity modulator 201 is located on a Fourier plane of the condenser 21. The light intensity modulator 201 is for receiving the incident light field 900 and modulating the incident light field 900 into a detection light field 901 having a plurality of color lights. The light intensity modulator 201 can be a liquid crystal module (TFT shield) for controlling a light penetration intensity or a liquid crystal on silicon (LCoS). The light intensity modulator 201 has a liquid crystal unit therein for changing an amount of light penetration and the colors of the penetration according to a controlling signal. That is, each liquid crystal being steered to correspond to different red, green, and blue filter elements is controlled by the controlling signal to determine a penetration degree of a specific color light, thereby forming the detection light field 901 having a plurality of color lights.

Figure 3A:
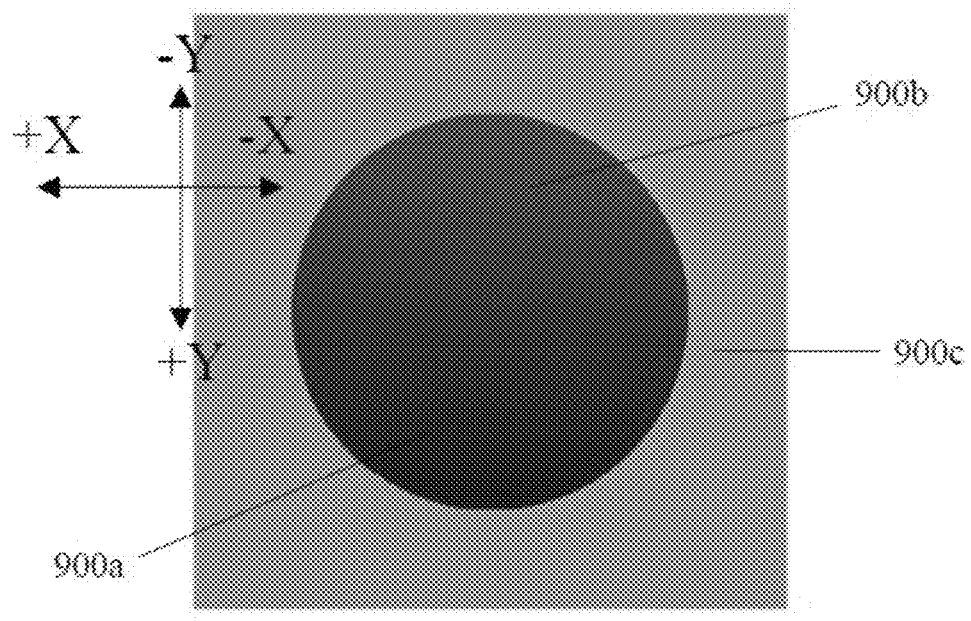
FIG. 3A, and FIG. 3B are schematic diagrams showing changes of gradient distributions of a light intensity along a first axial direction and a second axial direction according to the present disclosure.

FIG. 3A illustrates a schematic diagram after the detection light field 901 passes through the light intensity modulator 201. In this embodiment, the plurality of color lights includes a first color light 900a and a second color light 900b. In this embodiment, the first color light 900a is a blue light, the second color light 900b is a red light. In another embodiment, the first color light 900a may be a green light and the second color light 900b may be a red light, which may be determined according to a user's choice, and thus is not limited by the present disclose.

As shown in FIG. 3A, the first color light 900a is alight with a gradient distribution of increasing intensity along a first axial direction Y towards a first direction +Y. The second color light 900b is a color light with a gradient distribution of increasing intensity along the first axial direction Y towards a second direction −Y opposite to the first direction +Y. On a periphery of the first and second color lights 900a and 900b is a third color light 900c. In this embodiment, the third color light 900c is a green light. As FIG. 3A shows, the closer to below, the higher the composition of a blue light of the first color light 900a. The closer to above, the higher the composition of a red light of the first color light 900a.

Figure 3B:
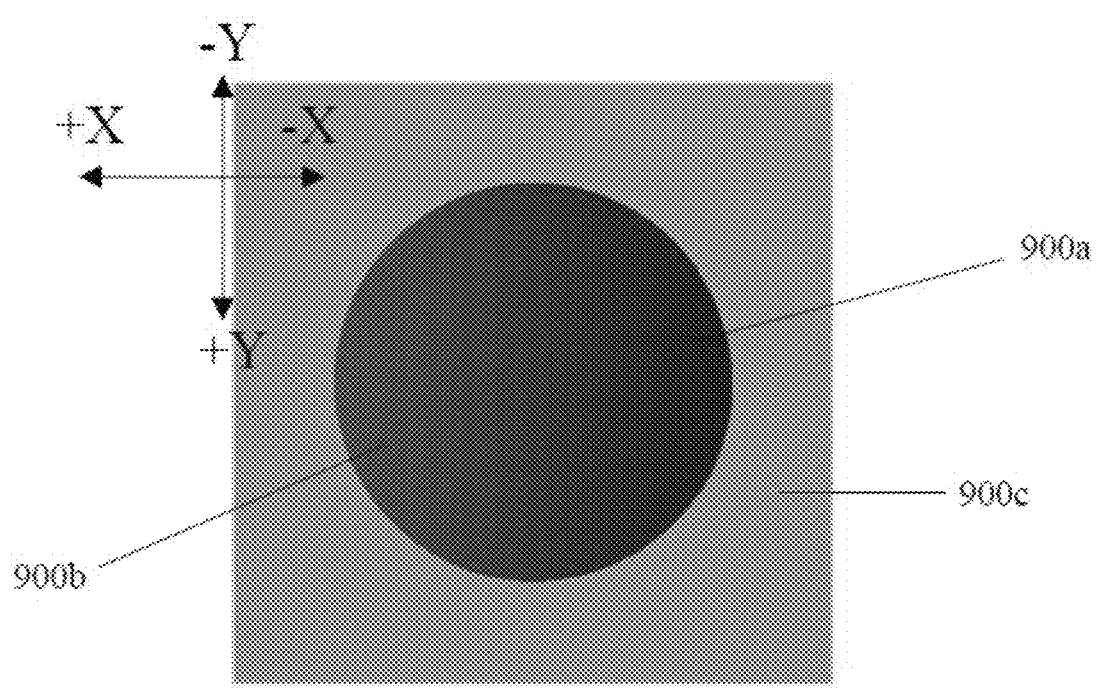

Additionally, the light intensity modulator 201 can change an orientation of the axial direction through a controlling signal, so that the direction of the gradient distribution is changed. In one embodiment, as shown in FIG. 3B, the first color light 900a is a color light having a gradient distribution of increasing intensity along a second axis X towards a first direction −X. The second color light 900b is a color light having a gradient distribution of increasing intensity along the second axis X towards a second direction +X opposite to the first direction −X. On a periphery of the first and second color lights 900a and 900b is a third color light 900c. In this embodiment, the third color light 900c is a green light. Therefore, as shown in FIG. 3B, the closer to the right-hand side, the higher is the composition of blue light of the first color light 900a, and the closer to the left-hand side, the higher is the composition of red light of the first color light 900a.

In addition, it should be noted that the orientations of the axial directions of FIGS. 3A and 3B are not limited by the XY axial directions, and may be other axial directions, for example, an axial direction having an angle with the X axis or the Y axis. It should be noted that although it is illustrated by two color lights, in another embodiment, more than two color lights may be used.

Figure 2B:
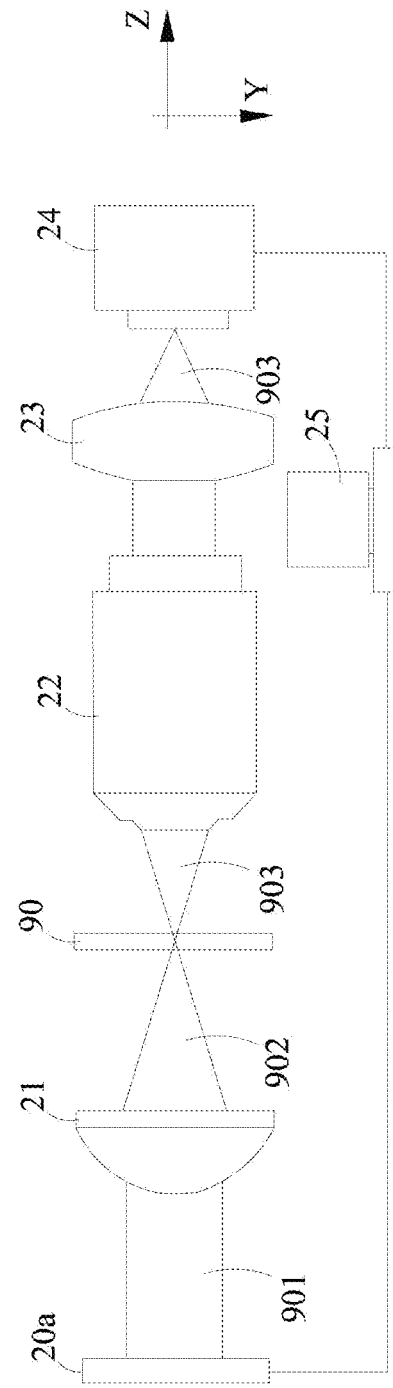
FIG. 2B is another optical architecture diagram of a system for quantitative differential phase contrast microscopy with an isotropic transfer function according to the present disclosure.

FIG. 2B illustrates another optical architecture diagram of a system for quantitative differential phase contrast microscopy with an isotropic transfer function according to an embodiment of the present disclosure. In this embodiment, FIG. 2B is substantially similar to FIG. 2A, and only differs in that the light source module 20a is an array of light emitting diodes (LED), for example, a micro-LED array. Through the controlling signal, the LED array directly generates the optical effects shown in FIG. 3A or in FIG. 3B, that is, directly generates the detection light field 901 with a plurality of color lights.

Returning to FIG. 2A, the condenser 21 is positioned on one side of the light intensity modulator 201. The condenser 21 is configured to receive the detection light field 901 modulated by the light intensity modulator 201. The light intensity modulator 201 is located on the Fourier plane of the condenser 21. The condenser 21 is configured to receive the detection light field 901. The condenser 21 further generates an off-axis light field 902 to project the light to a plurality of positions of a detectable object 90, thereby generating an object light field 903 about the detection positions.

The objective lens 22 is positioned at one side of the condenser 21, such that the object 90 is located at a focal length of the objective lens 22. The objective lens 22 receives the object light field 903 penetrating the object 90. It is to be noted that the architecture of the present disclosure can generate partially coherent illumination. In one embodiment, a condition for generating the partially coherent illumination is that the condenser 21 has a first numerical aperture (NA) value, the objective lens 22 has a second numerical aperture (NA) value, and a ratio of the first and second NA values ($NA_{condenser}/NA_{objective}$) is 1 or approximately 1. The effect of a partially coherent illumination is better than the effect of a coherent illumination of the conventional technique, such as, a resolution enhancement, increasing an optical sectioning effect, and reducing a coherent speckle noise.

The image capturing module 24 is coupled to the objective lens 22. The image capturing module 24 is configured to receive the object light field 903 to generate an optical image corresponding to the intensity gradient. In this embodiment, the image capturing module 24 is coupled to the objective lens 22 through a tube lens 23. In this embodiment, the objective lens 22 and the tubular lens 23 are structures of a microscopy system. The microscopy system may be a commercial one, for example, a Leica DMI3000 device.

It should be noted that, unlike the conventional technique for capturing an image corresponding to a light intensity mask (such as that illustrated in FIG. 1A to FIG. 1C) at one time, the present disclosure is characterized that, through the light intensity modulator 201 or the light source module 20 of the LED array, a plurality of color lights with different gradient distributions is generated. Then, one image captured by the image capturing module 24 has an image of the color light corresponding to the plurality of gradient distributions. Through appropriate color processing, an image of each color can be separated. Then, through one image capture, a plurality of images needed for differential phase contrast can be obtained. In this way, multiple images corresponding to different gradient distributions can be obtained by one shutter image acquisition, thereby saving measuring time.

Figure 4A:
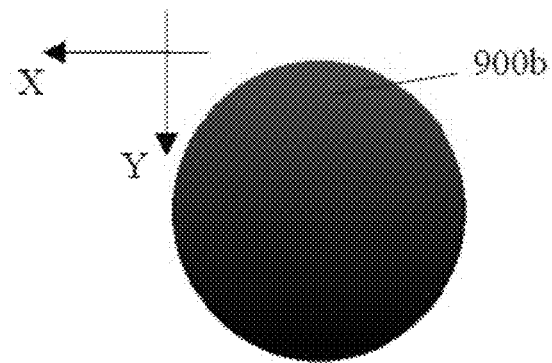
FIG. 4A, FIG. 4B, FIG. 4C, and FIG. 4D are schematic diagrams showing gradient distributions of the light intensity of a first color light and a second color light along different axial directions according to the present disclosure.
Figure 4B:
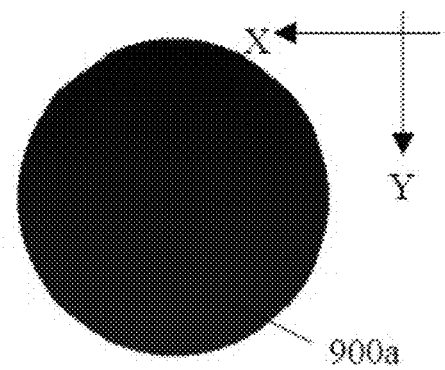
Figure 4C:
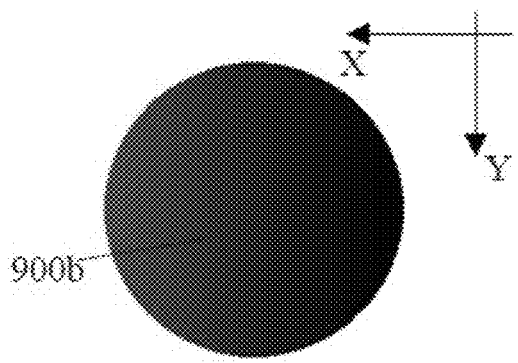
Figure 4D:
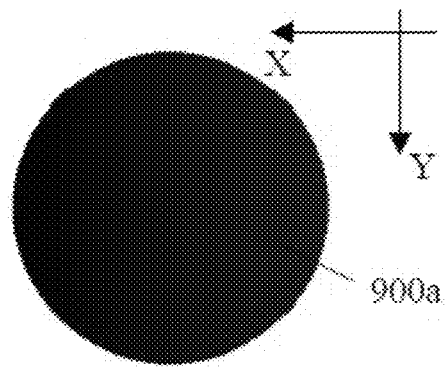

For example, the detection light field of FIG. 3A is equivalent to a combination of two-color lights as shown in FIGS. 4A and 4B. Taking the detection light field of FIG. 3B as an example, it is equivalent to a combination of two-color lights as shown in FIG. 4C and FIG. 4D. Therefore, through two image captures, four images corresponding to different gradient distributions can be obtained, which saves the time required for measurement. FIGS. 4A to 4D show the gradient distributions of the light intensity of each color light. FIG. 4A corresponds to an intensity gradient of the second color light 900b along a first axial direction Y. FIG. 4B corresponds to an intensity gradient of the first color light 900a along the first axial direction Y. FIG. 4C corresponds to an intensity gradient of the second color light 900b along a second axial direction X. FIG. 4D corresponds to an intensity gradient of the first color light 900a along the second axial direction X. Through a control of the light intensity gradients, when the semicircular bright and dark mask is used in each axis measurement, a problem of an amplitude cross generated in a middle-axis is avoided.

The operation processing unit 25 is electrically connected to the light intensity modulator 201. The operation processing unit 25 is configured to generate a controlling signal to control the light intensity modulator 201 to generate a combination of color lights along different axial orientations, for example, the detection light field 901 as shown in FIGS. 3A and 3B. The operation processing unit 25 can be a computer, a server, or a workstation having an arithmetic processing capability. The operation processing unit 25 can execute an application from a storage medium to make calculations about the captured image.

In addition, the operation processing unit 25 is further electrically connected to the image capturing module 24. The operation processing unit 25 is configured to receive an optical image about the object light field captured by the image capturing module 24, operate differential phase contrast calculations to obtain a phase of each detection position on the object 90, thereby reconstructing the surface profile or internal structural features of the object 90.

Figure 5:
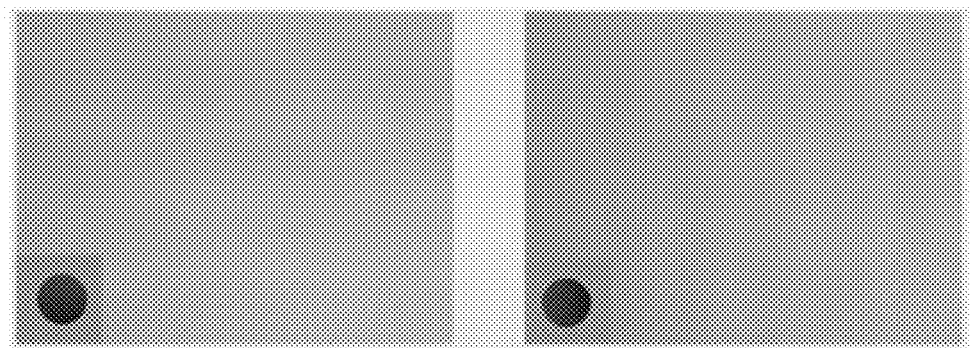
FIG. 5 shows first and second optical images captured by an image capturing module.
Figure 6:
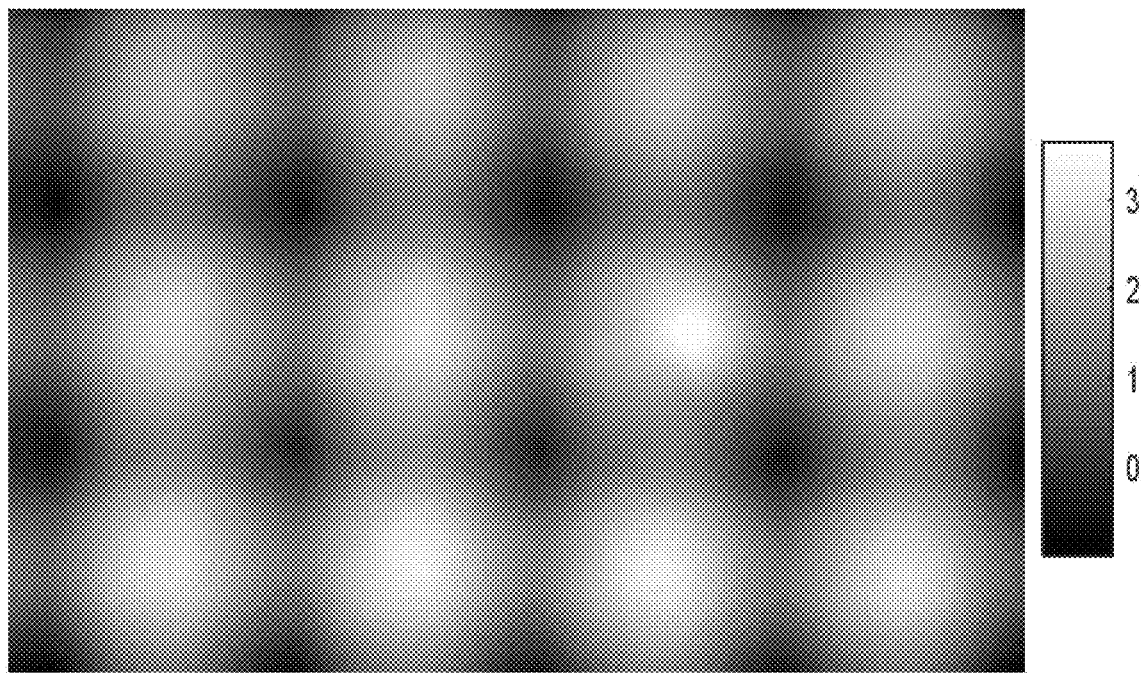
FIG. 6 is an image of distribution of phase information obtained by a multi-axis phase transfer function of the present disclosure.

In this embodiment, taking the object 90 as a micro lens array as an example, the image captured by the image capturing module 24 is as shown in FIG. 5. The operation processing unit 25 performs a color correction calculation and a color separation on the images captured by the detection light field 901 corresponding to the different combinations of colored light, to form an optical image corresponding to the different single-color light intensity gradients of FIGS. 4A to 4D. The phase information distribution image as shown in FIG. 6 is obtained by the differential phase contrast calculations. It should be noted that the manner of the color separations may be performed by the operation processing unit 25. In other embodiments, when capturing images, the image capturing module 24 may directly generate an optical image corresponding to different single-color light intensity gradients of FIGS. 4A to 4D.

Figure 7:
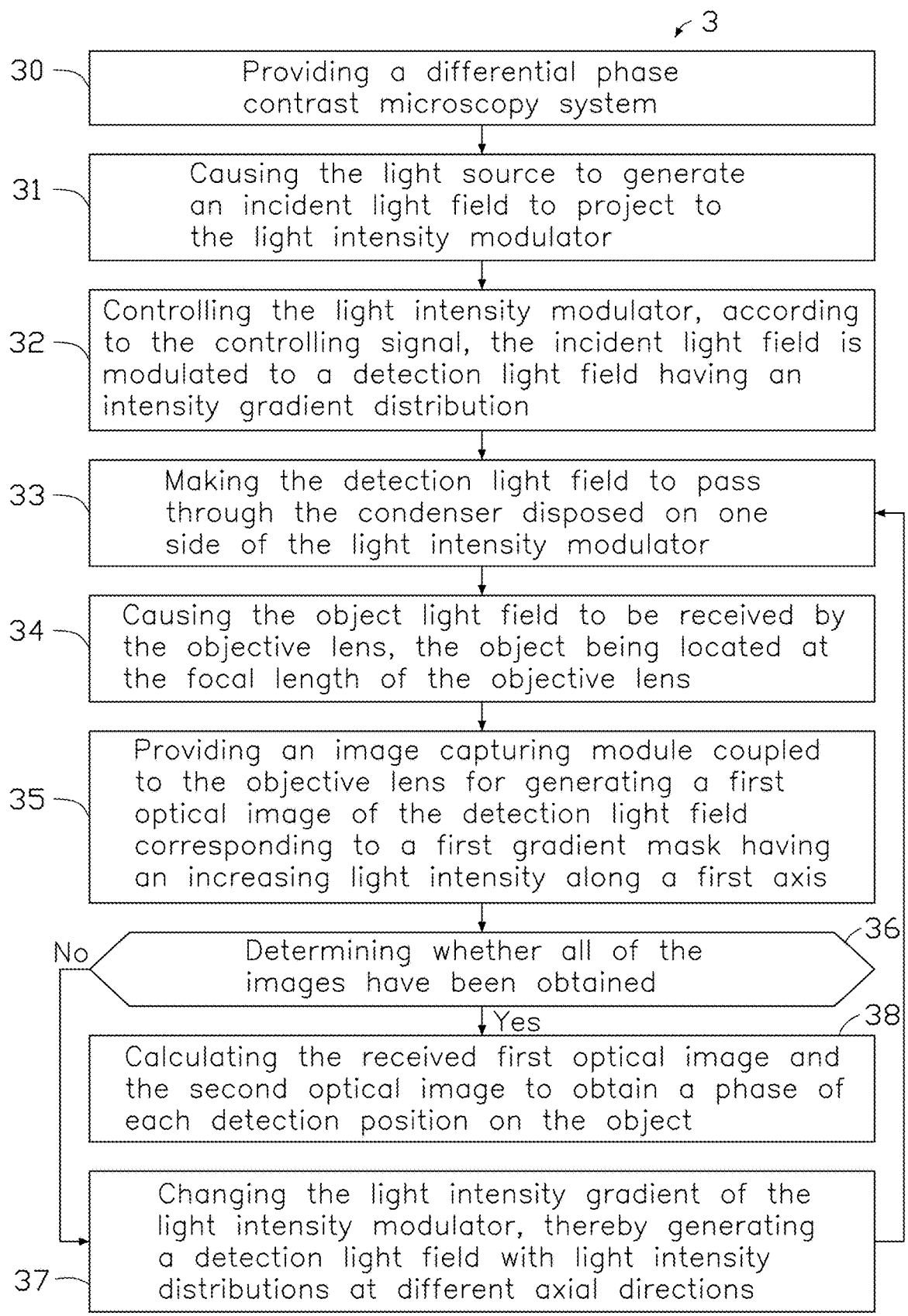
FIG. 7 is a flowchart of a method of applying differential phase contrast microscopy according to an embodiment of the present disclosure.

Referring to FIG. 2A and FIG. 7, FIG. 7 illustrates a flowchart of a differential phase contrast microscopy method according to the present disclosure. In this embodiment, the method (method 3) uses the microscopy system of FIG. 2A to perform a differential phase contrast microscopic measurement on an object surface. Firstly, step 30 is performed to provide a differential phase contrast microscopy system as shown in FIG. 2A or FIG. 2B. Next, step 31 is performed to cause the broadband light source 200 to generate an incident light field 900 projecting onto the light intensity modulator 201. Then, step 32 is performed to control the light intensity modulator 201. According to the controlling signal, the incident light field 200 is modulated to a detection light field 901 having an intensity gradient, as shown in FIG. 3A.

Next, in step 33, the detection light field 901 passes through the condenser 21 disposed on one side of the light intensity modulator 201. The light intensity modulator 201 is located on the Fourier plane of the condenser 21. The condenser 21 is configured to receive the detection light field 901 and generate an off-axis light field 902 projected onto an object 90, thereby generating an object light field 903. The object 90 may be a cell or a microstructure. In this embodiment, the object 90 is a micro lens array.

Next, step 34 is performed to cause the object light field 903 to be received by the objective lens 22. The object 90 is located at the focal length of the objective lens 22. Next, step 35 is performed to provide an image capturing module 24. The image capturing module 24 is coupled to the objective lens 22. The image capturing module 24 is configured to generate a first optical image corresponding to the light gradient of FIG. 3A, as shown in a left side diagram of FIG. 5.

Then, step 36 is performed to determine whether two images corresponding to light intensity gradients have been obtained at different axial directions. If not, step 37 is performed to change the light intensity gradient of the light intensity modulator 201, thereby generating a detection light field with light intensity distributions at different axial directions. For example, in this step 37, the operation processing unit 25 controls the light intensity modulator 201 to generate the detection light field 901 as shown in FIG. 3B. Then, it returns to step 33 and repeats the steps 33 to 35 for obtaining a second optical image of the detection light field 901, as shown in a right-side diagram of FIG. 5. It should be noted that the number of the optical images obtained corresponding to different axial directions is determined according to requirements of the calculations, one image (for example, either FIG. 3A or FIG. 3B) can be used for performing subsequent calculations, and the difference is an accuracy of the phase information.

After obtaining the first and second optical images respectively corresponding to the increasing and decreasing of the two axial gradients, step 38 is performed. The operation processing unit 25 performs an arithmetic processing analysis. The arithmetic processing analysis includes a color separation and a correction processing. The color separation and the color correction can use conventional techniques to generate the optical images corresponding to FIGS. 4A-4D. The calculation is further performed to obtain the phase of each detection position of the object 90, thereby reconstructing the surface profile or internal features of the object 90.

In this step 38, the first optical image is mainly divided into a first sub-optical image and a second sub-optical image, that is, the optical images corresponding to the light intensity gradients of FIGS. 4A and 4B. The second optical image is divided into a third sub-optical image and a fourth sub-optical image, that is, the optical images corresponding to the light intensity gradients of FIGS. 4A and 4B.

In an embodiment of a color separation and correction operation, through the red, green, and blue channels, an original white light is filtered into three separated colors, namely red (R) chromatogram, green (G) chromatogram, and blue (B) chromatogram by the first and second optical images. Each color channel will carry different image information. However, the chromatogram generated by the light intensity modulator 201 (TFT shield) may not exactly match a spectral response of a color image capturing module 24 (for example, a color camera). Due to color leakage, the light intensity of each color channel of the light intensity modulator 201 (TFT shield) affects the remaining adjacent color channels. Color leakage from different color channels severely degrades a quality of a reconstructed image. An RGB light intensity collected by the image capturing module 24 can be formulated as shown in the equation (1).

$$\begin{bmatrix} I_{Camera}^R \\ I_{Camera}^G \\ I_{Camera}^B \end{bmatrix} = T \begin{bmatrix} I_{TFT}^R \\ I_{TFT}^G \\ I_{TFT}^B \end{bmatrix} \quad \text{(equation (1))}$$

Wherein a parameter $I_{Camera}^G$ is a light intensity of the image capturing module 24. A parameter $I_{TFT}^G$ is a light intensity of the light intensity modulator 201 (TFT shield). The parameter g represents each color RGB. The spectrum is determined by the red R, green G, and the blue B channels of the image capturing module 24 and the red R, green G, and blue B channels of the TFT shield. The parameter T is a 3×3 transfer matrix, as shown in the following equation (2), which transmits the intensity of the original spectrum to the intensity received by image capturing module 24.

$$T = \begin{bmatrix} L_R^R & L_R^G & L_R^B \\ L_G^R & L_G^G & L_G^B \\ L_B^R & L_B^G & L_B^B \end{bmatrix} \quad \text{(equation (2))}$$

In equation (2), the parameter $L_w^v$ represents a ratio of color leakage from each color (RGB) channel v of the light intensity modulator 201 (i.e., TFT shield) to each color channel w of the image capturing module 24. The parameter $L_w^v$ can be obtained by experimental measurement. To restore the original image before the light passes through a filter of the image capturing module 24, an inverse matrix of T is multiplied by the intensity received from the image capturing module 24.

$$\begin{bmatrix} I_{TFT}^R \\ I_{TFT}^G \\ I_{TFT}^B \end{bmatrix} = T^{-1} \begin{bmatrix} I_{Camera}^R \\ I_{Camera}^G \\ I_{Camera}^B \end{bmatrix} \quad \text{(equation (3))}$$

By leakage correction, a quality of the reconstructed image will be significantly improved. Because each color camera has a different spectral response, the parameters T and T$^{-1}$ will vary depending on different color image capturing module 24. Therefore, each system must measure the matrix T one time for a color leakage correction.

In an embodiment, performing the calculation to obtain the phase of each detection position of the object includes the following steps. First, performing step 370, by the first and second sub-optical images (for example, corresponding to FIG. 4A and FIG. 4B), calculating a first phase contrast image $I_{DPC}$ corresponding to the light intensity of each detection position and performing a Fourier calculation, thereby obtaining a converted first phase contrast image value $\Im(I_{DPC,i}(r))$. Wherein i=1, representing the first axial direction. The parameter r(x, y) represents each detection position (x, y). The parameter $I_{DPC}$ is as shown in the following formula (formula (1)).

$$I_{DPC}=(I_1-I_2)/(I_1 I_2). \quad (1)$$

In this step, the parameter $I_1$ in the formula (1) is the light intensity value of the first sub-optical image corresponding to each detection position. The parameter $I_2$ is the light intensity value of the second sub-optical image corresponding to each detection position.

Next, in step 371, by the third and fourth sub-optical images (for example, corresponding to FIG. 4C and FIG. 4D), calculating a second phase contrast image $I_{DPC}$ corresponding to the light intensity of each detection position and performing a Fourier calculation, thereby obtaining a converted second phase contrast image value $\Im(I_{DPC,i}(r))$. Wherein i=2, representing the second axis Y. The parameter r(x, y) represents each detection position (x, y). The parameter $I_{DPC}$ is as shown in the above formula (1).

In this step, the parameter $I_1$ in the formula (1) is the light intensity value of the third sub-optical image corresponding to each detection position. The parameter $I_2$ is a light intensity value of the fourth sub-optical image corresponding to each detection position.

Then, step 372 is performed to calculate a first inner product of the converted first phase contrast image value $\Im(I_{DPC,i}(r))$, i=1 and a first transfer function $H_{DPC,i}$, i=1, a second inner product of the converted second phase contrast image value $\Im(I_{DPC,i}(r))$, i=2 and a second transfer function $H_{DPC,i}$, i=2, and a sum of the first and second inner products. The parameter $H_{DPC,i}$ is as shown in the following formula (formula (2)). A sum of processes of the step 372 is as shown in the following formula (formula (3)).

$$\tilde{H}_{DPC}(u) = [\tilde{H}_{p,1}(u) - \tilde{H}_{p,2}(u)]/2\tilde{I}_0 \quad (2)$$

$$\sum_i H_{DPC,i} \times \mathcal{J}(I_{DPC,i}(r)) \quad (3)$$

Where the parameters $H_{p,1}(u)$ and $H_{p,2}(u)$ are a pair of images about each axial direction, respectively. The parameter $\tilde{I}_0$ is a background of the light field, for example, the phase transfer function (pTF) of a S(u) of the first and second images, or the third and fourth images, which is corresponding to each mask. The parameter S(u) is defined in the following formula (formula (4)).

$$S(u)=m(u)\mathrm{circ}(u/\rho_c) \quad (4)$$

Wherein the parameter u=($u_x$, $u_y$) is defined as spatial frequency coordinates. The parameter m(u) is a function $\rho_c=NA_{condenser}/\lambda$ of the mask generated by the light intensity modulator 21. Wherein the parameter $NA_{condenser}$ represents the numerical aperture value of the condenser 22. The parameter $\lambda$ is an operating wavelength of the incident light field. The parameter circ($\xi$) is defined in the following formula (formula (5)).

$$\mathrm{circ}(\zeta) = \begin{cases} 1, & |\zeta| \le 1 \\ 0, & |\zeta| > 1 \end{cases}. \quad (5)$$

Figure 6A:
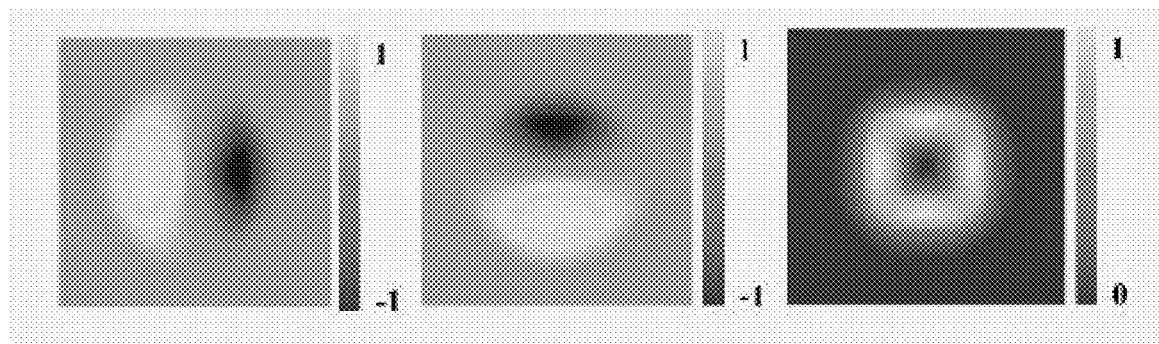
FIG. 6A is a simulation diagram of a phase transfer function, which is formed by a conventional differential phase contrast microscopy system using a biaxial semicircular mask.
Figure 6B:
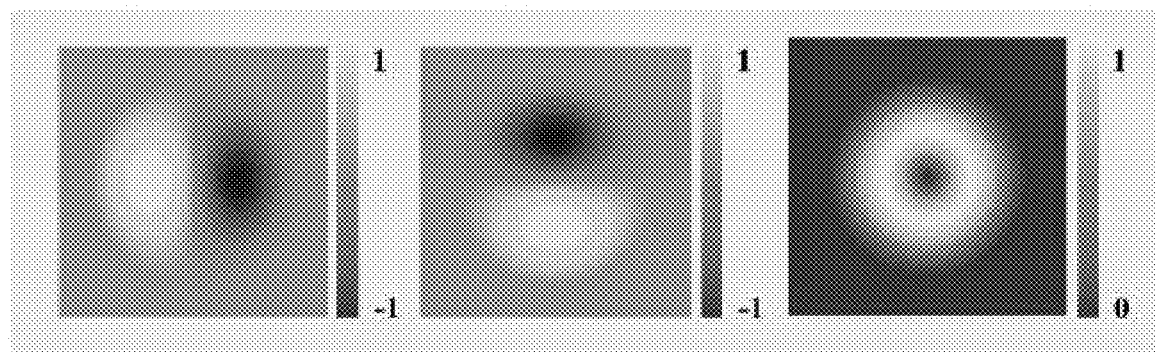
FIG. 6B is a simulation diagram of a phase transfer function, which is formed by a differential phase contrast microscopy system of the present disclosure using a mask having a biaxial gradient distribution.
Figure 6C:
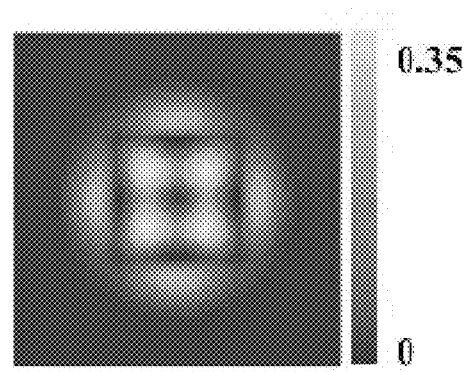
FIG. 6C is a result of subtraction of an intensity of the conventional phase transfer function from an intensity of the phase transfer function of the present disclosure.

Referring to FIG. 6A to FIG. 6C, FIG. 6A is a simulation diagram of a phase transfer function, which is formed by a conventional differential phase contrast microscopy system using a biaxial semicircular mask. FIG. 6B is a simulation diagram of a phase transfer function, which is formed by a differential phase contrast microscopy system of the present disclosure using a mask having a biaxial gradient distribution. FIG. 6C is a result of subtraction of an intensity of the conventional phase transfer function and an intensity of the phase transfer function of the present disclosure.

In FIG. 6B, the first diagram represents a phase transfer function image of a horizontal axis (corresponding to the transfer functions of FIGS. 4C and 4D). The second diagram represents the phase transfer function image of a vertical axis (corresponding to the transfer functions of FIGS. 4A and 4B). The third diagram represents the phase transfer function image of the two axes. As can be seen from the phase transfer function image of the two axes in FIGS. 6A and 6B, the intensity of the transfer function in FIG. 6A exhibits a non-isotropic result. The intensity of the transfer function of the present disclosure appears, under a partially coherent illumination, a transfer function image with isotropic characteristics evenly distributed like a donut. Therefore, the present disclosure reduces the coherent spot noise and strengthens the analysis degree by using the transfer function image generated by the mask with the intensity gradient change.

Next, in step 373, a square sum of the first transfer function and the second transfer function is added to a noise suppression function to resolve the following formula (formula (6)).

$$\sum_i |H_{DPC,i}|^2 + \eta(\alpha \times \mathcal{J}(|\nabla_\perp|^2) + \beta \times W(u)^2) \quad (6)$$

Wherein the parameter $\eta(\alpha \times \Im(|\nabla_\perp|^2)+\beta \times W(u)^2)$ represents the noise suppression function and further includes a high frequency suppression function $\alpha \times \Im(|\nabla_\perp|^2)$ and a low-frequency suppression function $\beta \times W(u)^2$. The parameter $\nabla_\perp$ is a first-order differential operator along the vertical axis and the horizontal axis. The parameter $\tilde{W}(u)=\exp(-u^2/\sigma_w^2)$ represents a scaling function. The scaling function is used to suppress the low frequency noise. The parameter $\sigma_w$ is a standard deviation. The parameters $\eta$, $\alpha$, and $\beta$ are adjustment parameters, and in one embodiment, they are 1, $10^{-2}$-$10^{-3}$, and $10^{-3}$-$10^{-4}$, respectively.

Then, step 374 is performed to divide the sum of step (c) by the value obtained by adding the step (d). And finally step 375 is performed, and the following formula (formula (7)) gives the result of step (e). The result is Fourier inverse transformed to obtain a phase corresponding to each detection position. After obtaining the phase of each detection position, the features of the object can be restored according to the phase value, for example, the surface profile.

$$\phi(r) = \mathcal{F}^{-1}\left\{ \frac{\sum_i H_{iDPC,i} \times \mathcal{F}(I_{iDPC,i}(r))}{\sum_i |H_{iDPC,i}|^2 + \eta(\alpha \times \mathfrak{I}(|\nabla_\perp|^2) + \beta \times W(u)^2)} \right\} \quad (7)$$

The following formula (formula (8)) illustrates differences from a traditional analytical method. In formula (8), the parameter $H_{DPC,\,i}$ represents the transfer function. The parameter $I_{DPC,\,i}(r)$ represents the phase contrast image of each axis. The parameter 3 represents a Fourier transform calculus.

$$\phi(r) = \mathcal{F}^{-1}\left\{ \frac{\sum_i H_{DPC,i} \cdot \mathcal{F}(I_{DPC,i}(r))}{\sum_i |H_{DPC,i}|^2 + \gamma} \right\}, \quad (8)$$

In the conventional phase reduction equation, the present disclosure further adjusts the constant γ to $\eta(\alpha \times \mathfrak{I}(|\nabla_\perp|^2) + \beta \times W(u)^2)$. The obtained biaxial images (first and second images, third and fourth images) of the present disclosure are performed by a noise processing of high and low frequencies, thereby improving the resolution of the phase reduction. After obtaining the phase information φ(r) of each position, the corresponding depth information can be restored according to the phase information. The relationship between phase information and depth information is well known to one skilled in the art and is not described herein.

In the foregoing embodiment, the color light combination having the intensity gradient is used to detect the object, and then a phase reduction calculation is performed. In addition to the foregoing, in another embodiment, at least one modulation pattern, which has a varied optical amplitude gradient and is generated by the optical system, can be used to generate white light or a single-color light for projection onto the object.

Figure 8:
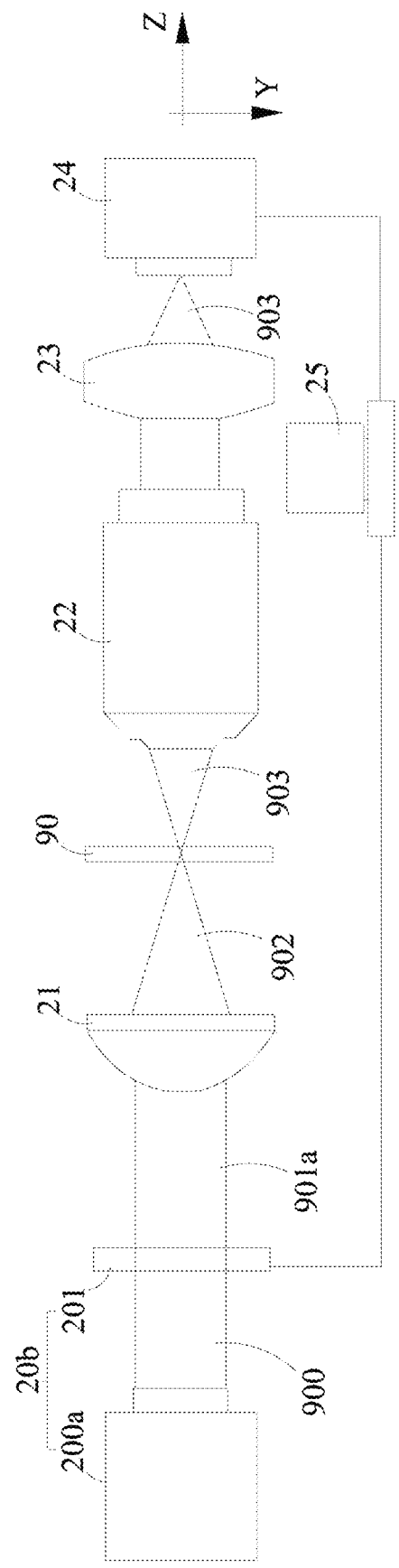
FIG. 8 is another optical architecture diagram of a system for quantitative differential phase contrast microscopy with an isotropic transfer function according to the present disclosure.

FIG. 8 is a schematic diagram of another embodiment of the quantitative differential phase contrast microscopy system with an isotropic transfer function of the present disclosure. Similar to FIG. 2A, the system includes a light source module 20b, a condenser 21, an objective lens 22, and an image capturing module 24. The light source module 20b includes a light source 200a and a light intensity modulator 201. The light source 200a is a broadband visible light source, such as, a white light source, but is not limited thereto. For example, a monochromatic visible light source can also be implemented.

The light intensity modulator 201 is disposed on one side of the light source 200a. According to the controlling signal, the light intensity modulator 201 generates a modulation pattern that modulates a light intensity gradients of the incident light field 900. In the architecture of the embodiment, the difference from the foregoing architecture is that, in this embodiment, the light intensity modulator 201 is used to generate at least one modulation pattern having a varied optical amplitude gradient along the radial direction to modulate the incident light field 900. Then the incident light field 900 forms a detection light field 901a. The detection light field 901a is different from the detected light field 901 in that the detection light field 901 is formed by the light intensity modulator 201 controlling the steering degree of liquid crystal corresponding to different filters (RGB), to form a plurality of color lights. Therefore, the spectrum of the detection light field 901 and the spectrum of the incident light field 901 are been different under the liquid crystals of different filters (RGB), thereby forming the detection light field 901 with various combinations of color lights. The spectrum of the detection light field 901a and the spectrum of the incident light field 900 in FIG. 8 are the same. Therefore, if the light source 200a generates a white light field, the detection light field 901a is also white light. Similarly, if the light source 200 generates a single-color light, the detection light field 901a is also the single-color light.

It is to be noted that the at least one modulation pattern includes a first varied optical amplitude gradient modulation pattern and a second varied optical amplitude gradient modulation pattern having at least one axial direction being symmetrical. In one embodiment, as FIGS. 9A-9F show, different modulation patterns can be generated by the light intensity modulator.

Figure 9A:
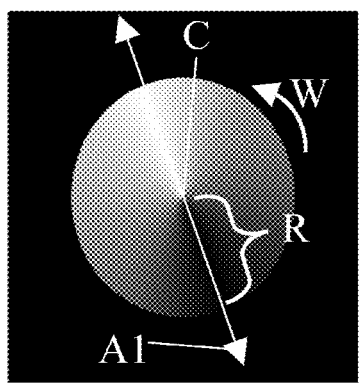
FIG. 9A, FIG. 9B, FIG. 9C, FIG. 9D, FIG. 9E, and FIG. 9F are schematic diagrams showing different modulation patterns generated by a light intensity modulator.

The radial direction having a means of varied optical amplitude gradient, centered on the optical axis of the incident light field with a radius of a specific length and along a radial of the light intensity modulator, to generate the modulation pattern having varied optical amplitude gradient. As shown in FIG. 9A, an optical axis C of the incident light field is the center of the modulation pattern. The specific length R is a radius. The varied optical amplitude gradient is modulated along the radial direction W. The axial direction A1 is a direction having an angle with the horizontal axis.

Figure 9B:
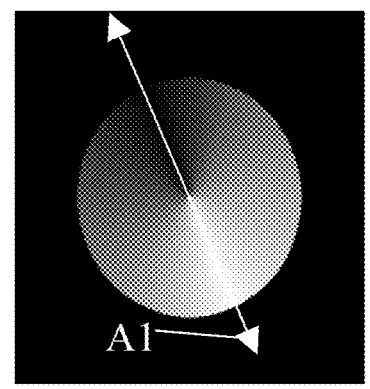

In FIG. 9A, with the axial direction A1 as the boundary, the gradient variation of the right half is seen to be stronger in a counterclockwise direction. The gradient variation of the left half is weaker in a counterclockwise direction. As shown in FIG. 9B, the axial direction A1 is the same as that of FIG. 9A, the difference is that the modulation direction of the light amplitude gradient variation is opposite to that of FIG. 9A.

Figure 9C:
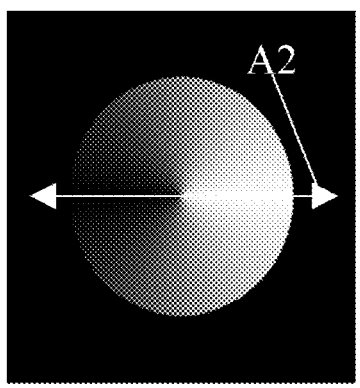
Figure 9D:
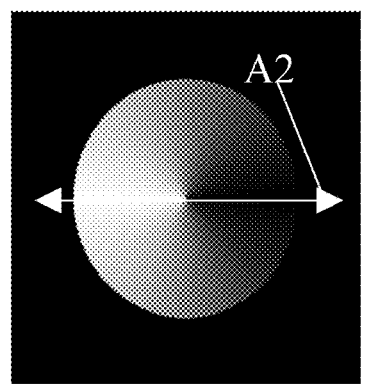
Figure 9E:
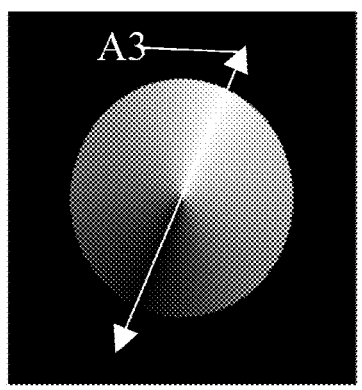
Figure 9F:
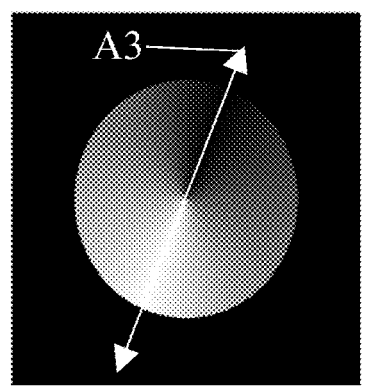

FIGS. 9C and 9D are substantially similar to FIGS. 9A and 9B, and show the differences as the axial direction A2 being in the horizontal direction. In FIG. 9C, with the axial direction A2 as the boundary, the gradient variation of the upper half is seen to be weaker in the counterclockwise direction. The gradient variation of the lower half is stronger in the counterclockwise direction. The gradient variation in FIG. 9D is opposite to that of FIG. 9C. As shown in FIG. 9E and FIG. 9F, which are substantially similar to FIGS. 9A and 9B, the difference is in the axial direction A3. In FIG. 9E, with the axial direction A3 as the boundary, the gradient variation of the right half is stronger in the counterclockwise direction. The gradient variation in the left half is weaker in the counterclockwise direction. The gradient variation in FIG. 9F is opposite to that of FIG. 9E.

Returning to FIG. 8, the condenser 21 is disposed on one side of the light intensity modulator 201. Then the light intensity modulator 201 is located on the Fourier plane of the condenser 21. The condenser 21 is configured to receive the detection light field 901a and generate an off-axis light field 902 to project onto an object 90, thereby generating an object light field 903. The objective lens 22 is disposed on one side of the condenser 21, such that the object 90 is located at a focal length of the objective lens 22 and the objective lens 22 receives the object light field 903. The image capturing module 24 is coupled to the objective lens 22 for receiving the object light field 903 to generate an optical image corresponding to the varied optical amplitude gradient.

As shown in FIG. 9A to FIG. 9F, after the light intensity modulation module 201 is modulated by the operation processing unit 25 into the pattern of FIG. 9A, the image capturing module 24 generates an image. Then, the operation processing unit 25 sequentially controls the light intensity modulator 201 to modulate the modulation patterns of FIGS. 9B to 9F, so that the image capturing module 24 captures the modulated optical images.

After the operation processing unit 25 captures six optical images corresponding to FIGS. 9A to 9F, the optical images corresponding to the modulation patterns of FIGS. 9A and 9B are grouped. The optical images corresponding to the modulation patterns of FIGS. 9C and 9D are grouped, the optical images corresponding to the modulation patterns of FIGS. 9E and 9F are grouped, and then the differential phase contrast calculation is performed. The algorithm is as shown in the above formulas (1)-(7).

Figure 10:
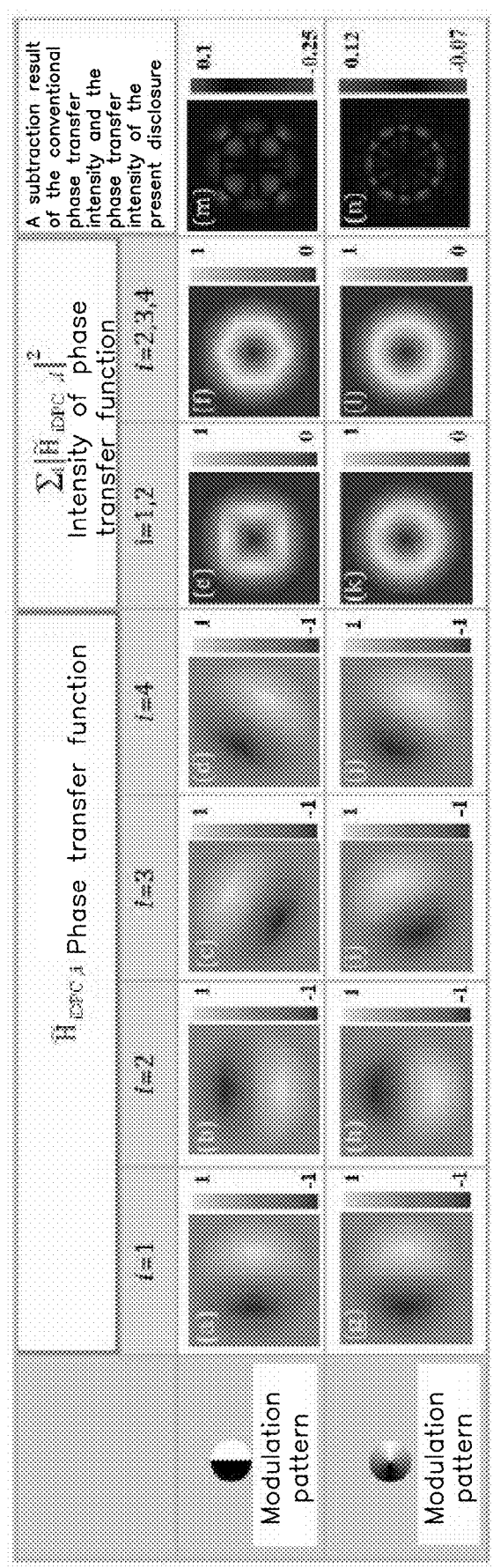
FIG. 10 is a diagram of comparisons between a semicircular modulation pattern of the conventional technique and a modulation pattern of the present disclosure having a gradient variation in optical amplitude.

FIG. 10 shows a comparison between the conventional technique and a modulation pattern of the present disclosure having a gradient variation of an optical amplitude. FIGS. 10(a-d) are phase transfer function simulation images of a conventional semicircular modulation pattern in different axial directions. FIGS. 10(e-f) represent the simulation images of the intensity of the phase transfer function when using two axes (i=1, 2) and using three axes (i=2, 3, 4), respectively. FIGS. 10(g-j) are phase transfer function simulation images of the modulation patterns with a circular radial gradient variation in different axial directions. FIGS. 10(k-l) represent simulation images of the intensity of the phase transfer functions when using two axes (i=1, 2) and using three axes (i=2, 3, 4), respectively.

Figure 1A:
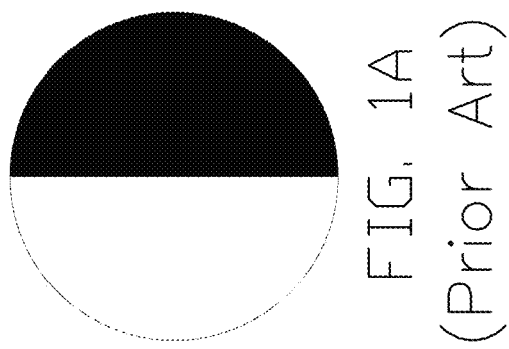
Figure 1B:
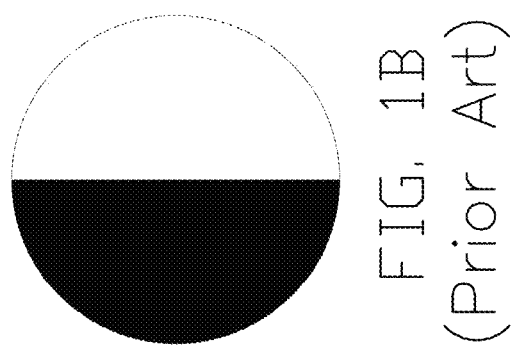

FIG. 10(m) shows a result of subtraction of the phase transfer functions of FIG. 10(e) from FIG. 10(l). FIG. 10(n) shows a result of subtraction of the phase transfer functions of FIG. 10(f) from FIG. 10(l). As can be seen from the phase transition function intensity images of FIGS. 10(e-f) and FIGS. 10(m-n), in FIGS. 10(e-f), no matter whether biaxial or triaxial, the intensity of the transfer function exhibits a non-isotropic result. It should be noted that if the isotropic transfer function intensity image needs to be presented in the conventional technique, it would take up to 12 axes (as shown in FIG. 1C), which takes time and effort. However, the intensity of the transfer function of the present disclosure is as shown in FIG. 10(m-n). Under a partially coherent illumination, the transfer function image, having isotropic characteristics evenly distributed like a donut, only needs two or three axes. Compared to the prior art, the number of the axial directions is greatly reduced and an efficiency in detection is increased.

Figure 11:
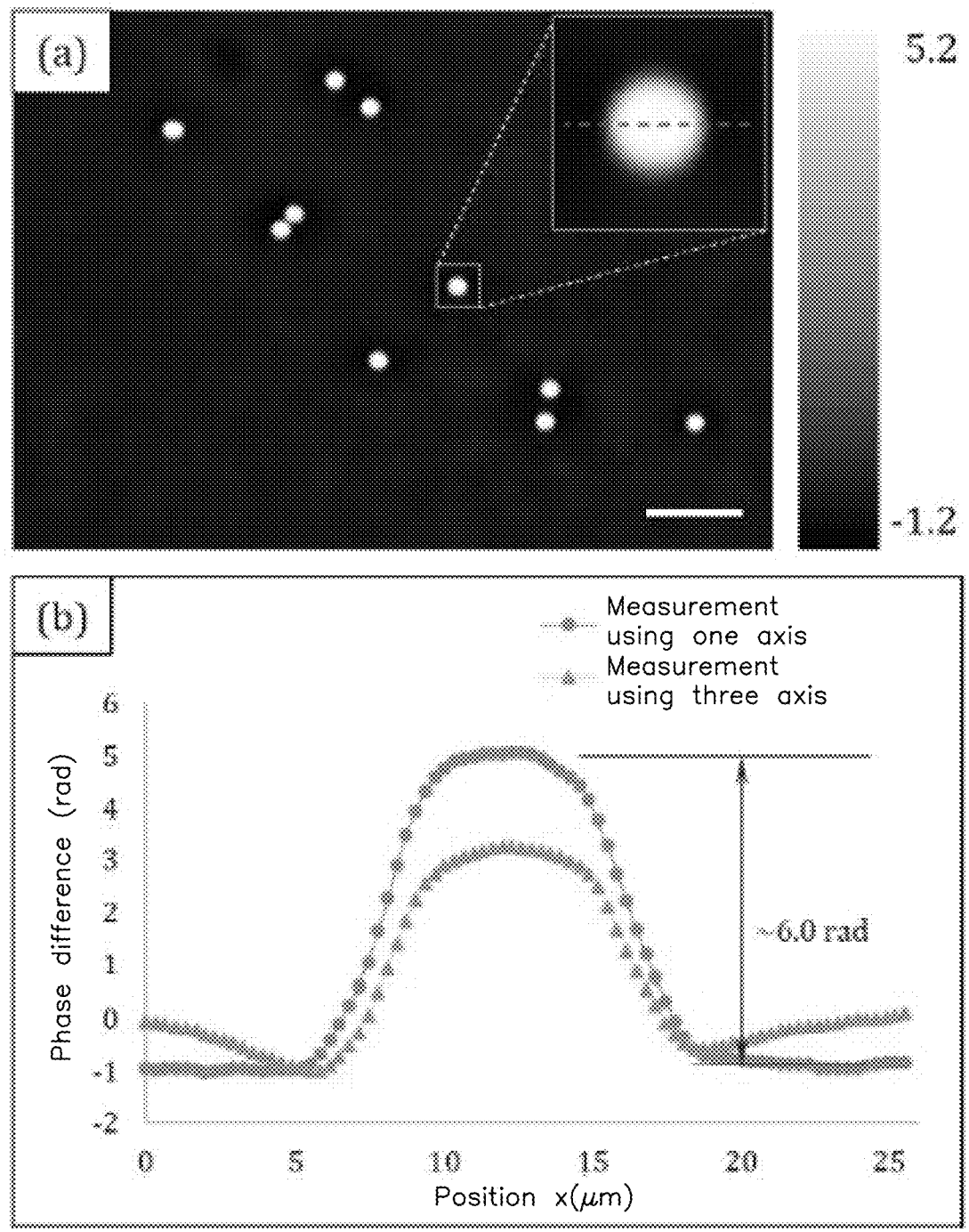
FIG. 11 is a diagram showing a result when the optical system of FIG. 8 is applied to the measurement of a surface profile on microspheres.
Figure 12:
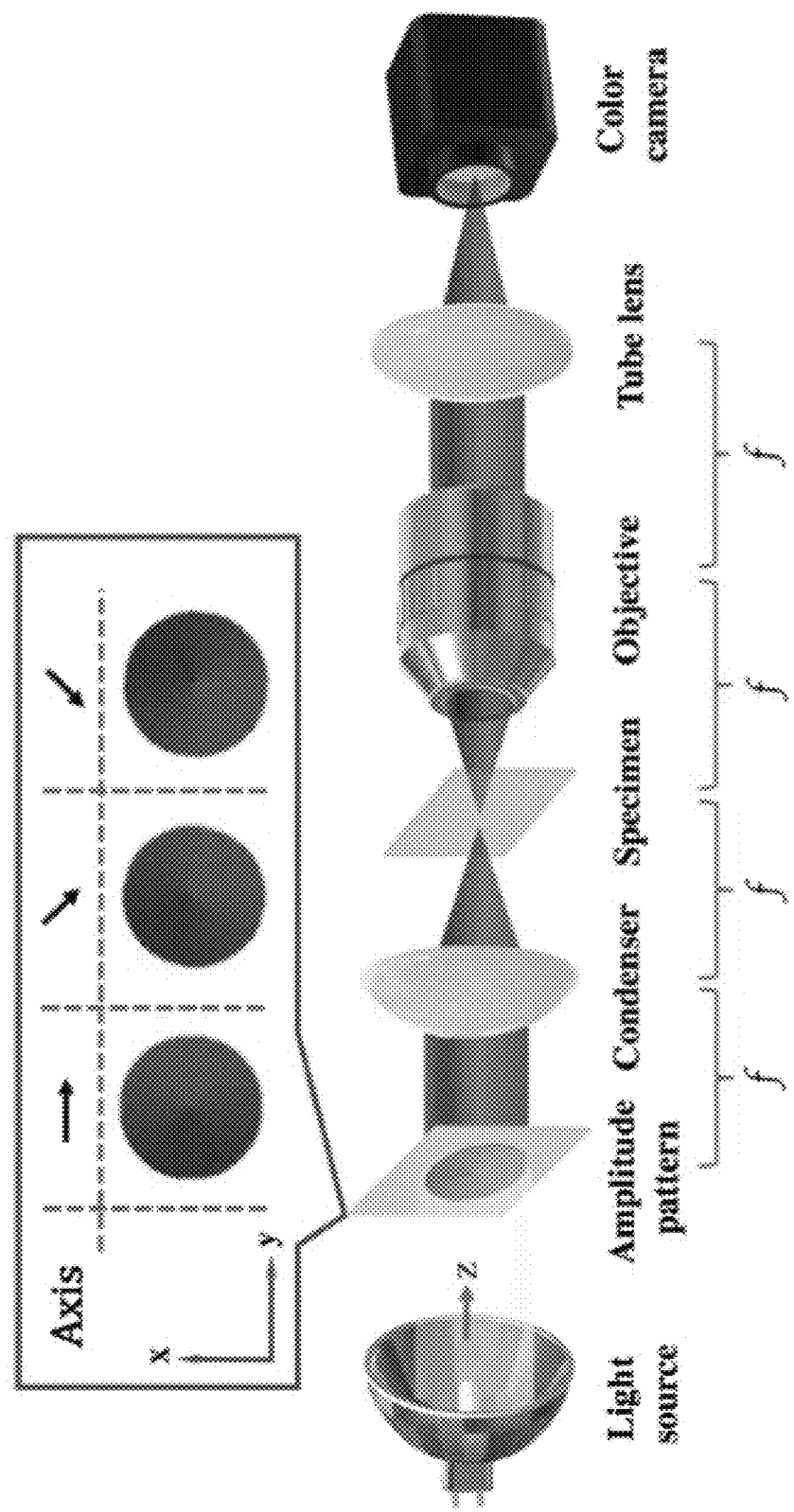
FIG. 12 is a schematic diagram of MW-iDPC system using a commercially inverted microscope.
Figure 13A:
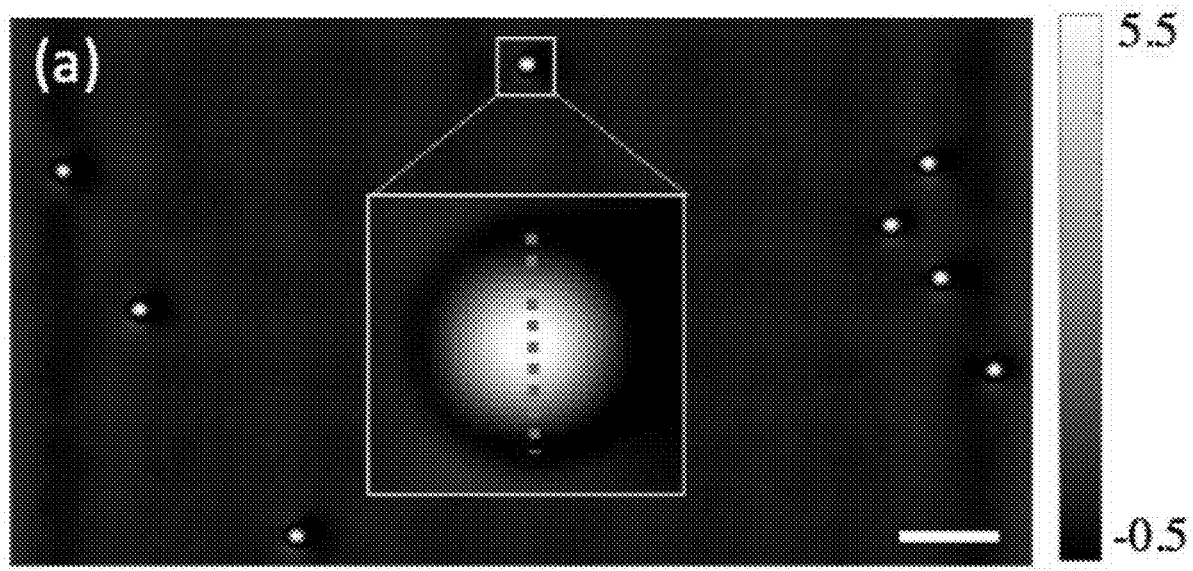
FIG. 13A is a quantitative phase image of microspheres reconstructed by MW-iDPC system with color leakage correction.
Figure 13B:
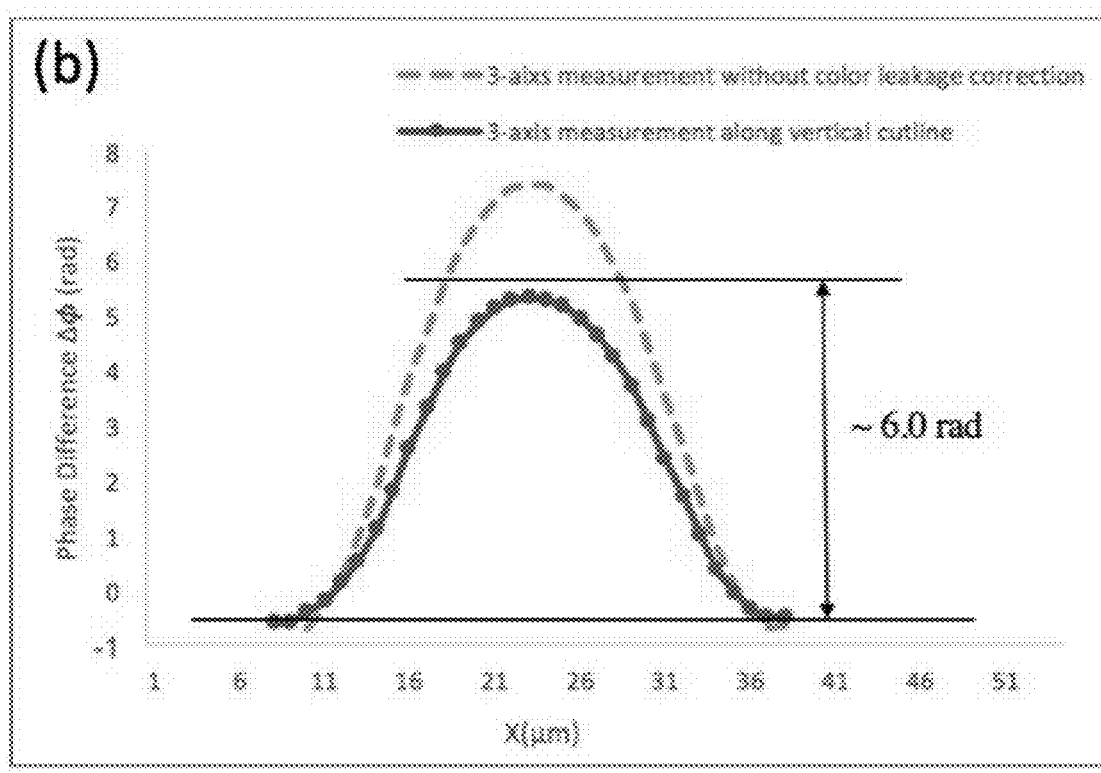
FIG. 13B is a measured phase distribution of the cross-section along the dashed line of a zoom-in microsphere.
Figure 14:
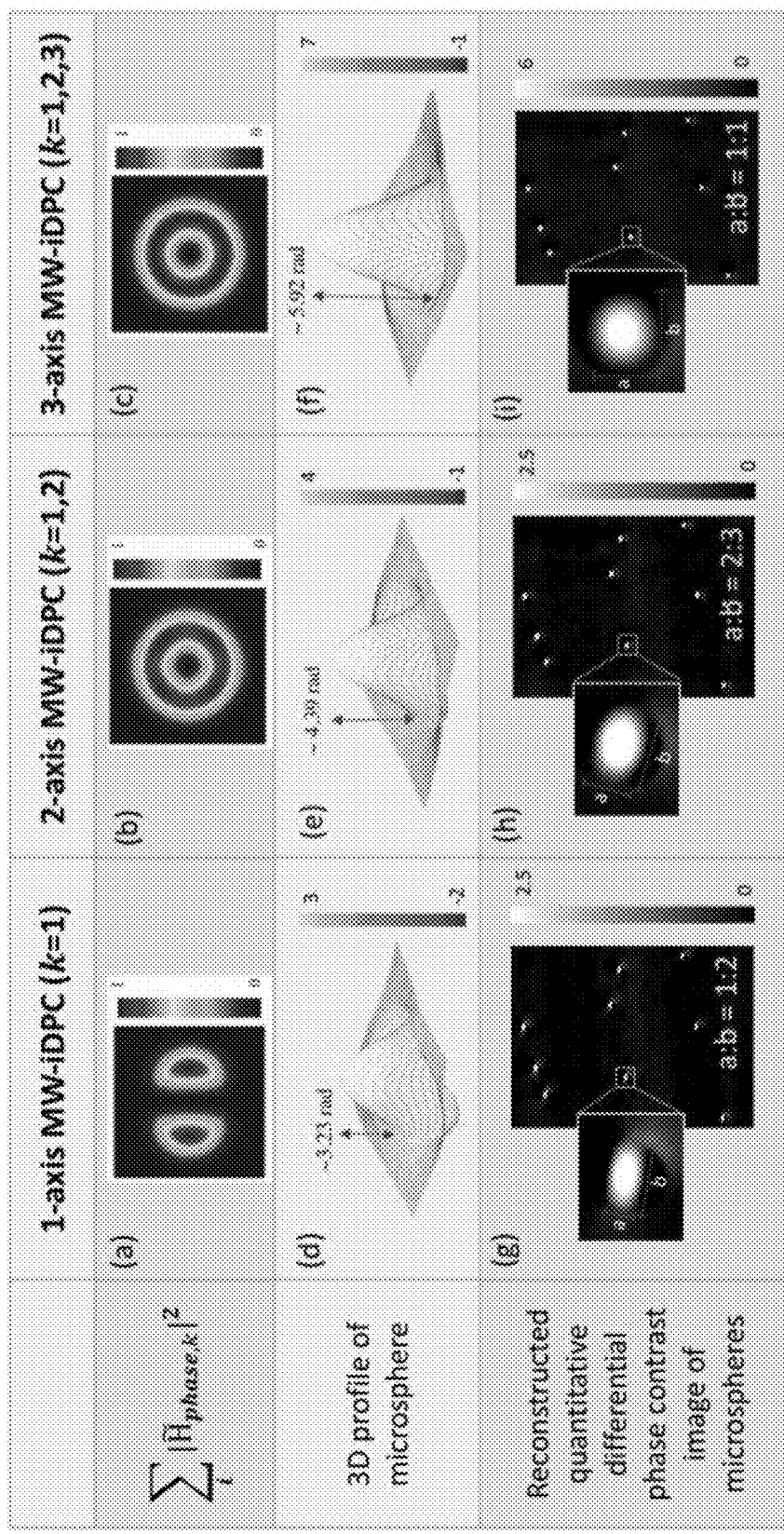
FIG. 14 shows the constructed quantitative phase images of live breast cancer cells.
Figure 15:
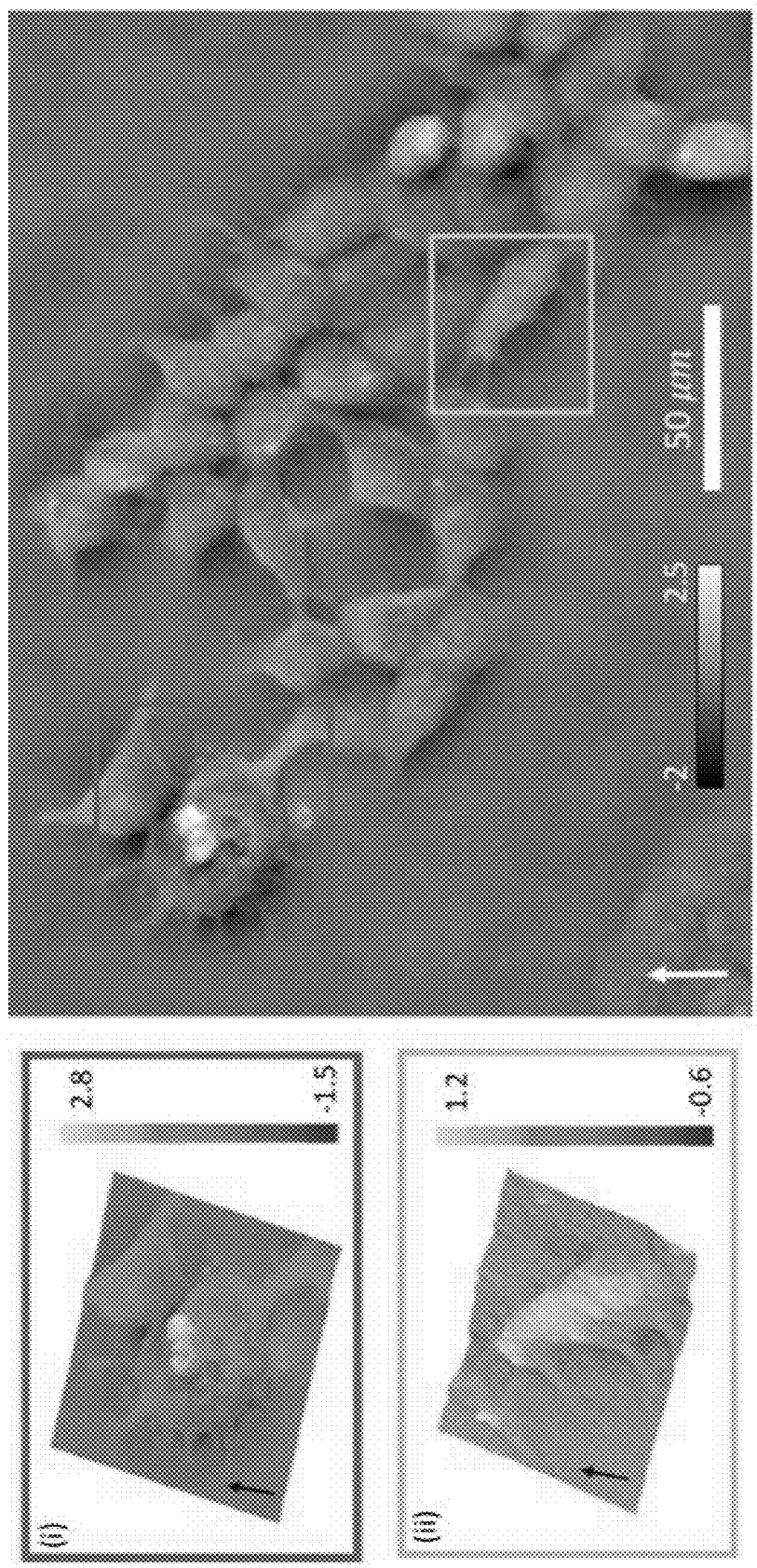
FIG. 15 is a quantitative phase image of live breast cancer cells using MW-iDPC system.
Figure 16:
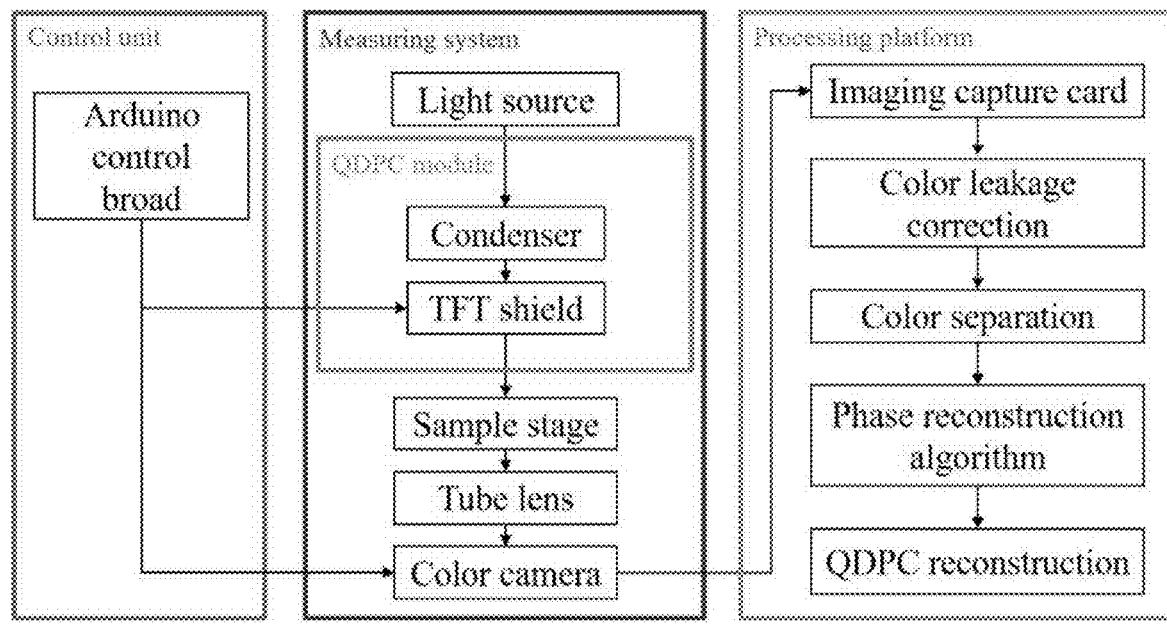
FIG. 16 is a functional structure of the develop QDPC system.
Figure 17:
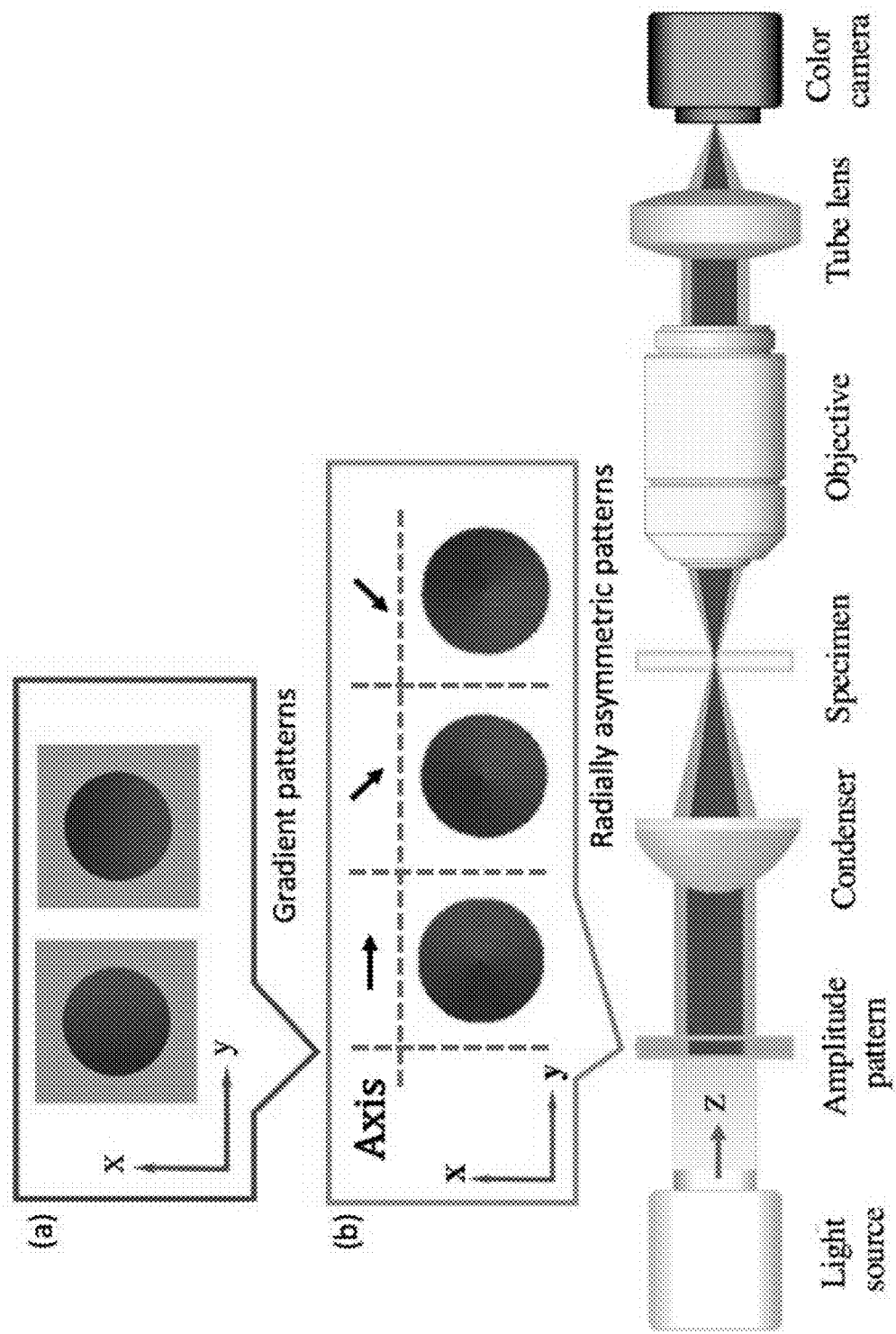
FIG. 17 is an optical configuration of QDPC measurement system.
Figure 18:
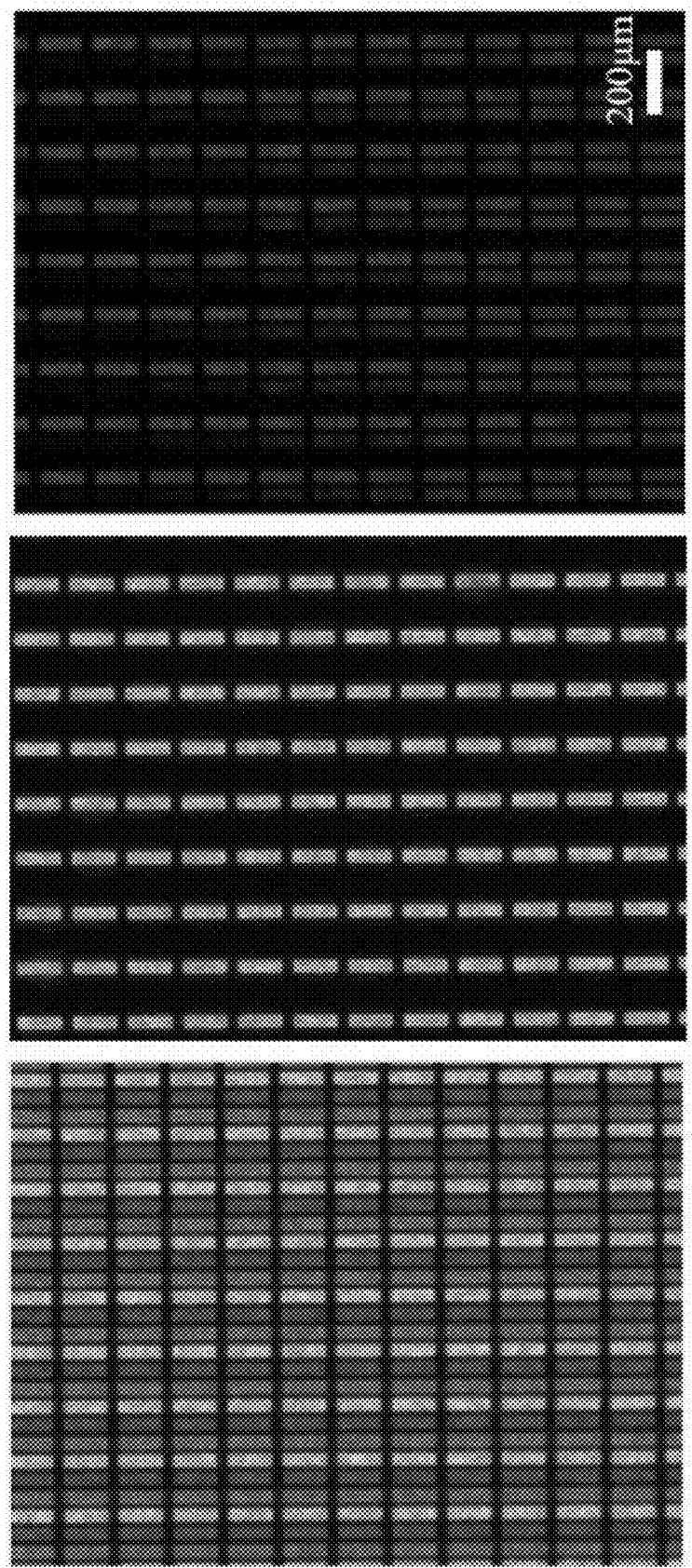
FIG. 18 shows the TFT shield with different color displayed.
Figure 19:
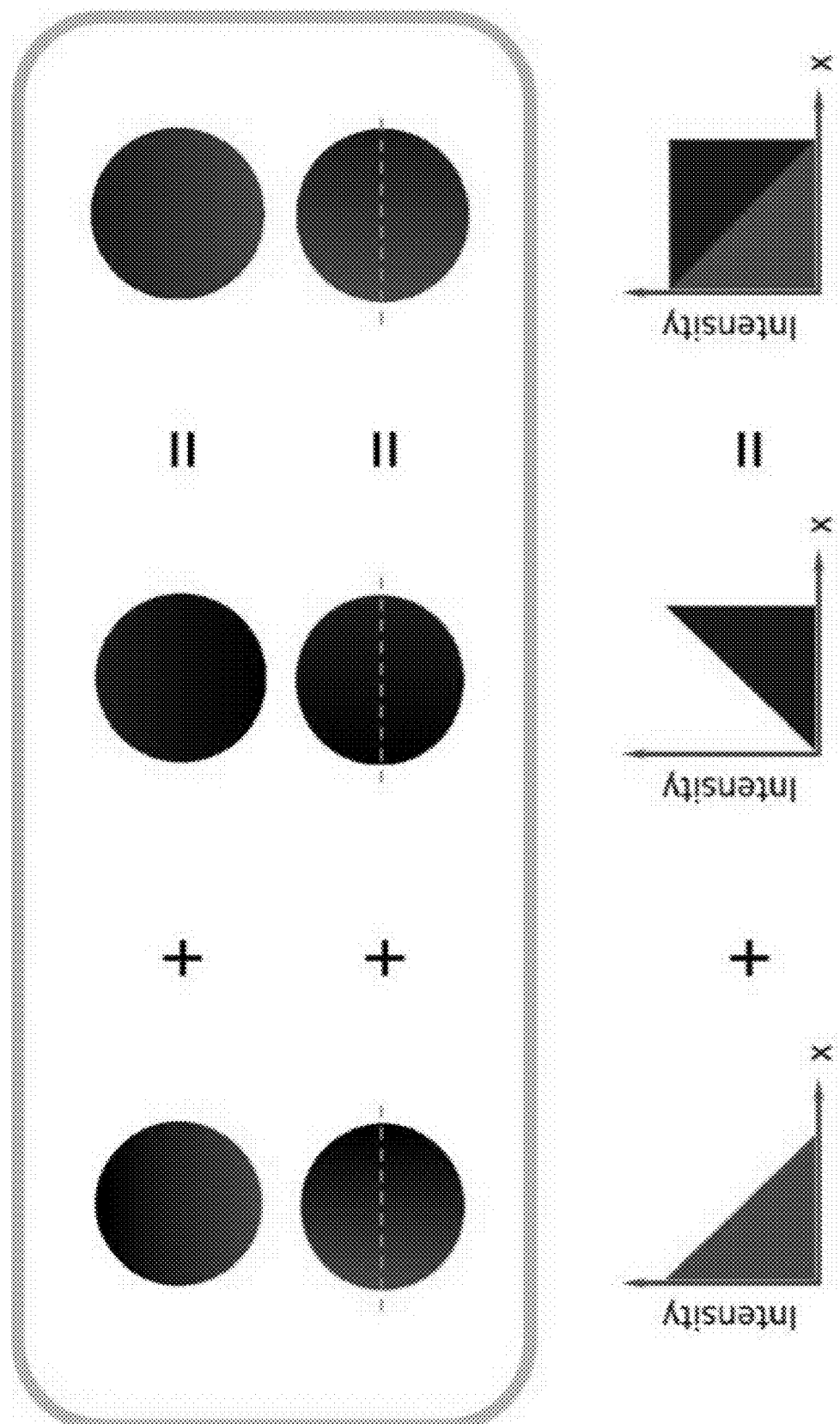
FIG. 19 shows pupil forms and illumination intensities.
Figure 20:
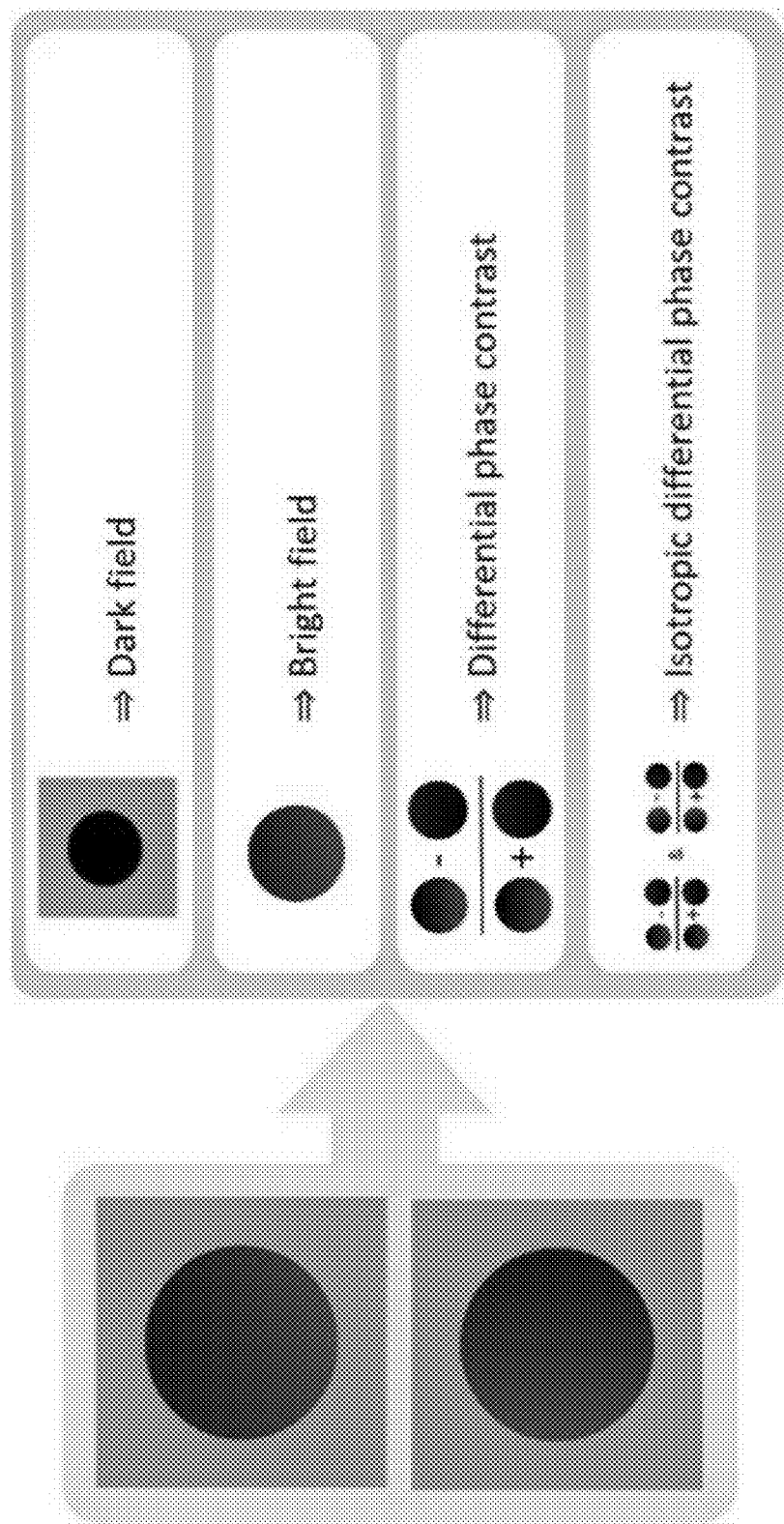
FIG. 20 shows four illumination-types for imaging.
Figure 21:
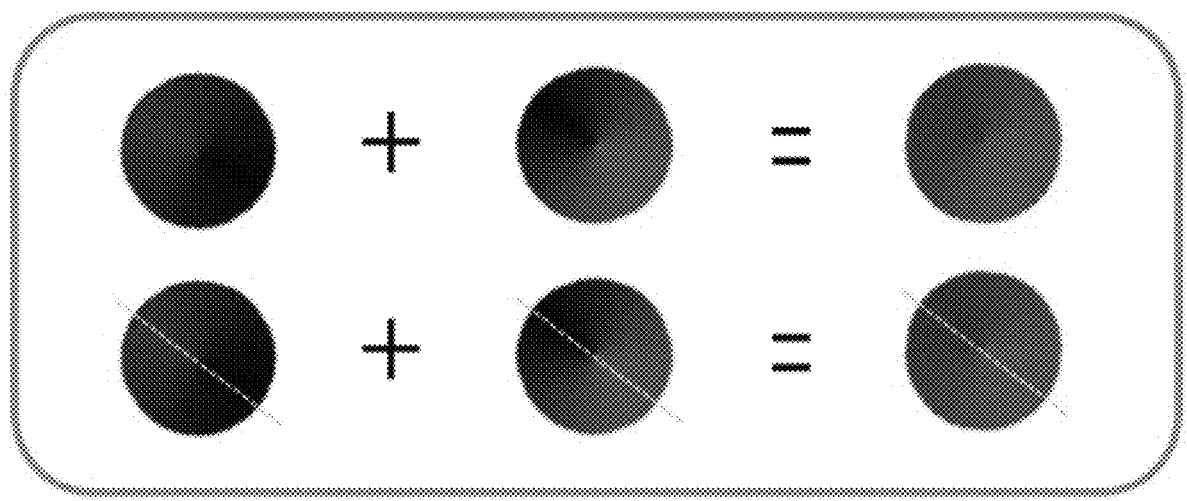
FIG. 21 shows pupil forms.
Figure 22:
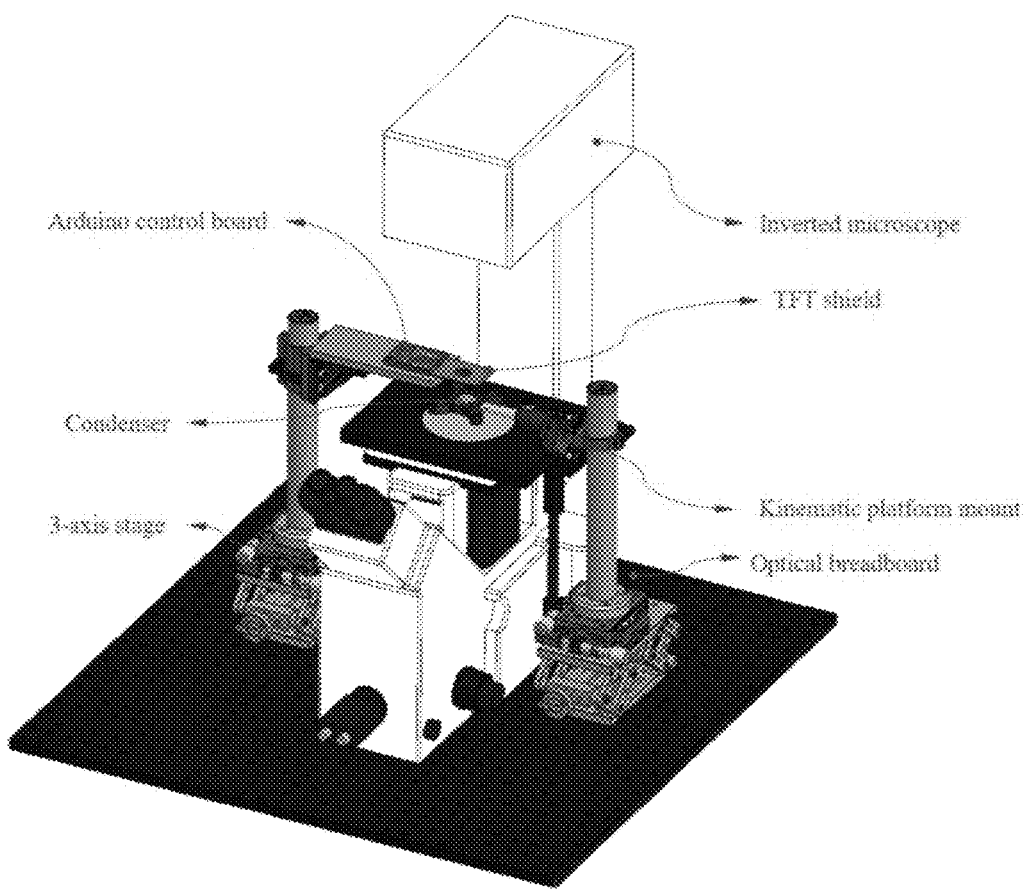
FIG. 22 shows a modular QDPC microscope.
Figure 23:
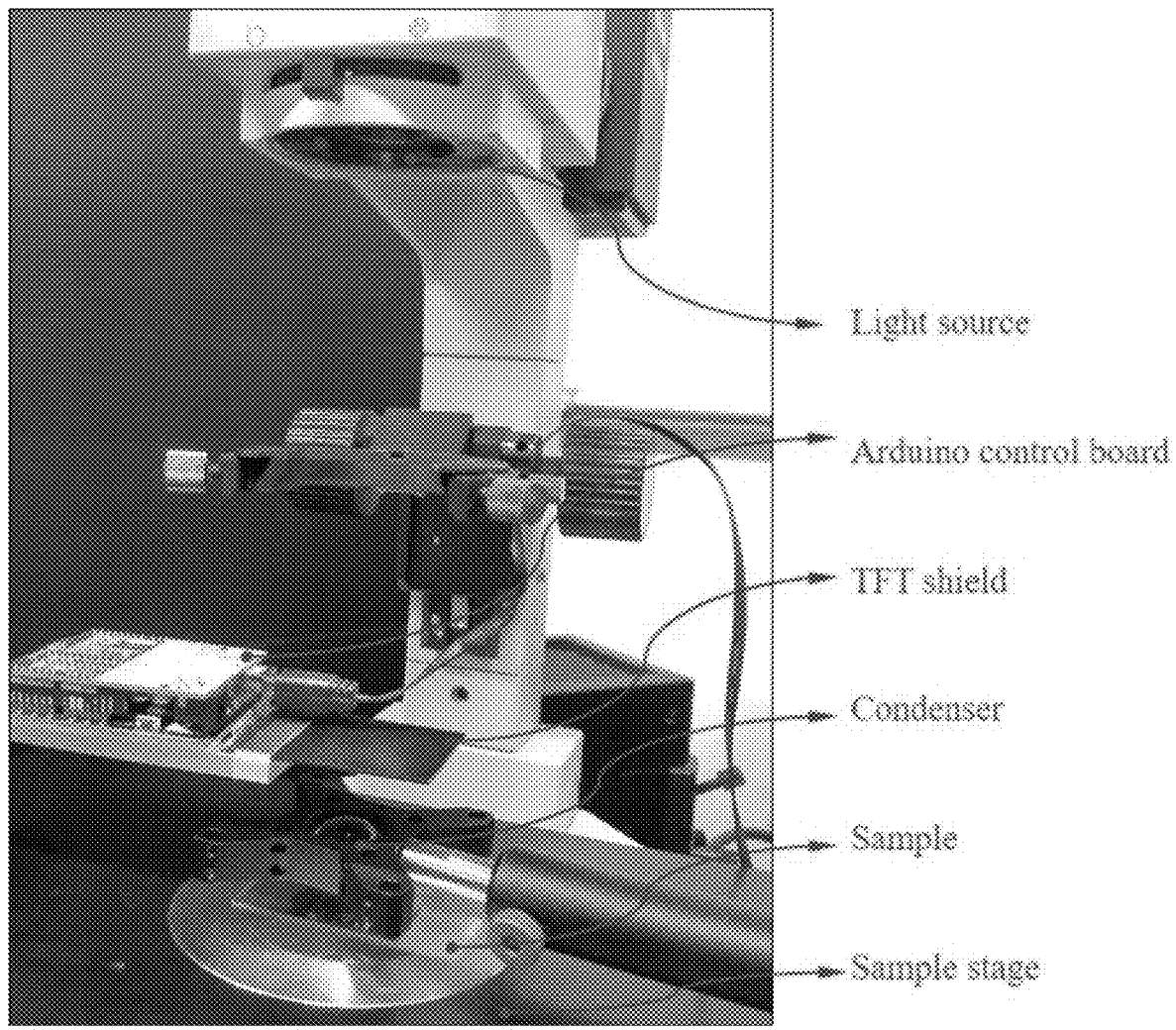
FIG. 23 shows a close shot of modular QDPC device.
Figure 24:
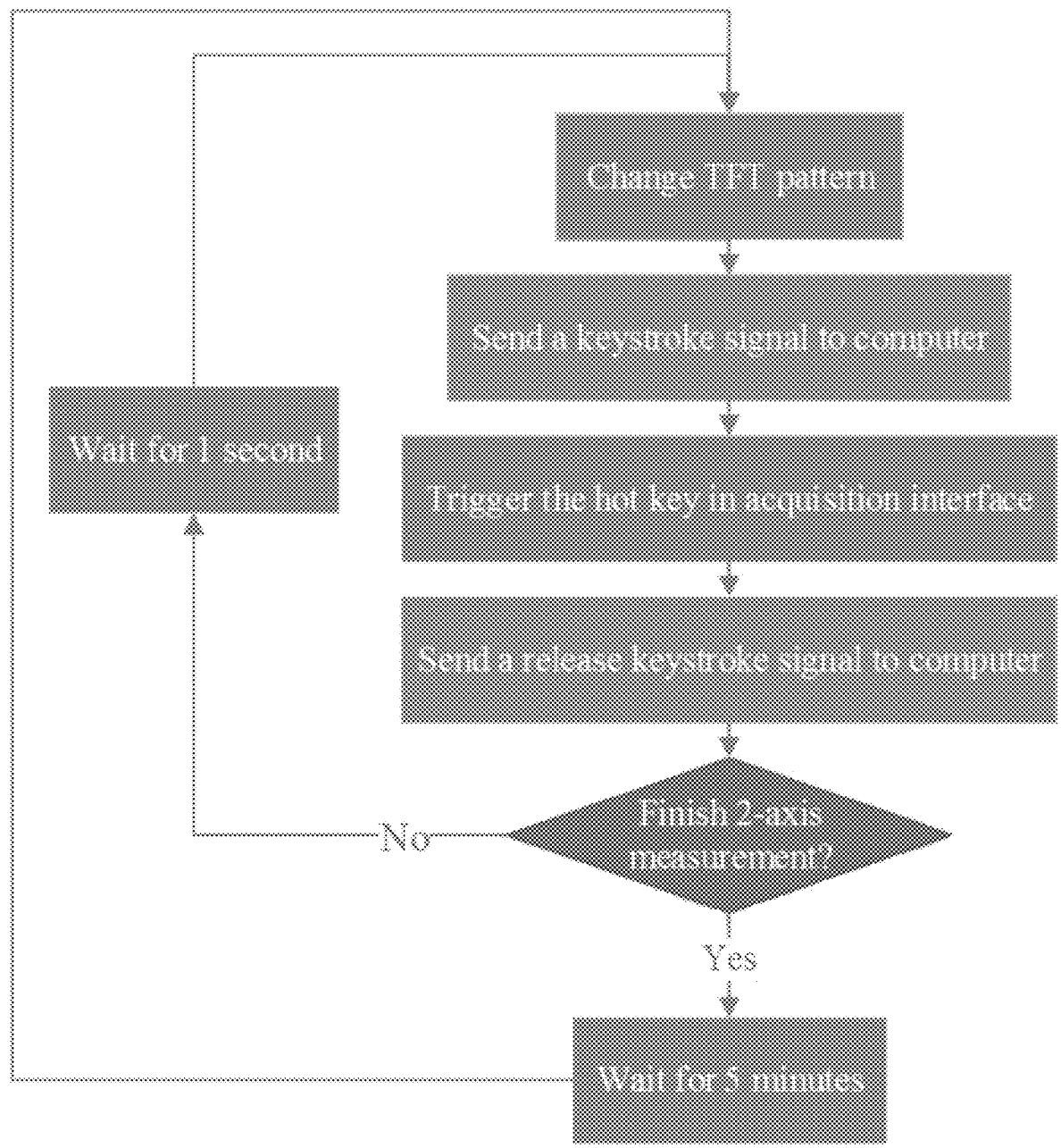
FIG. 24 shows a flow diagram of acquisition control.
Figure 25:
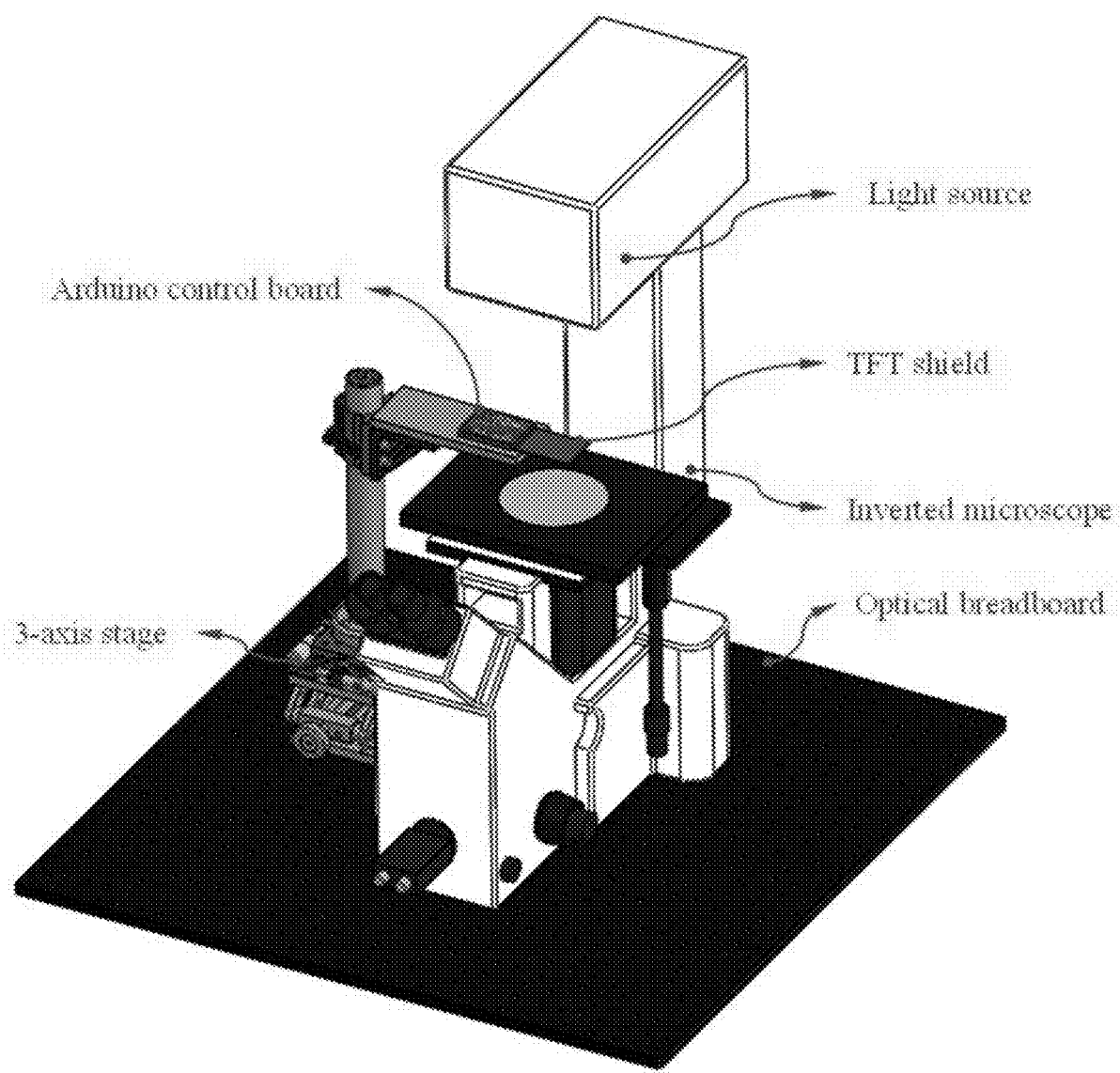
FIG. 25 shows experiment setup for color leakage correction.
Figure 26:
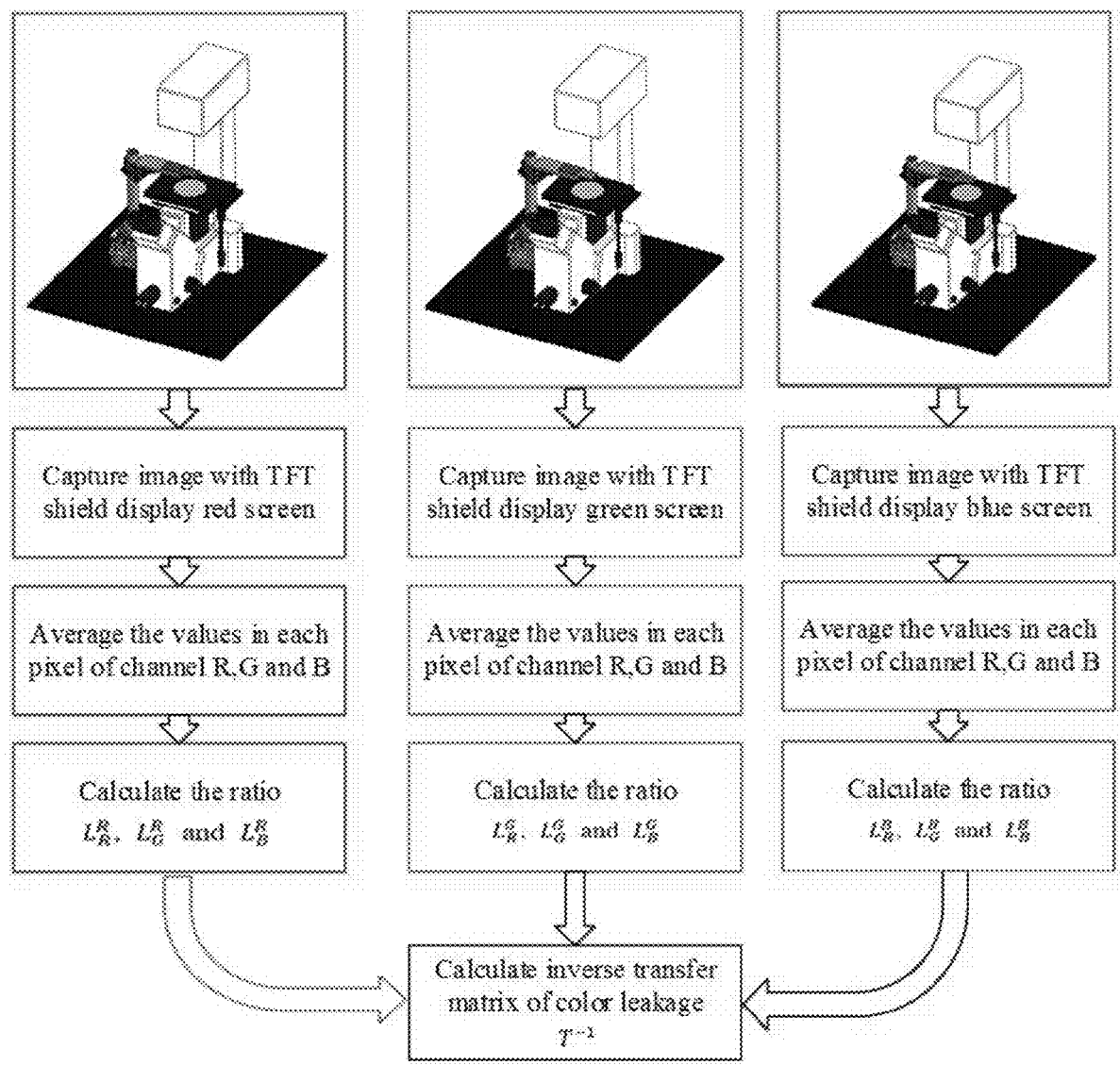
FIG. 26 shows a flow chart of measurement for color leakage correction.
Figure 27:
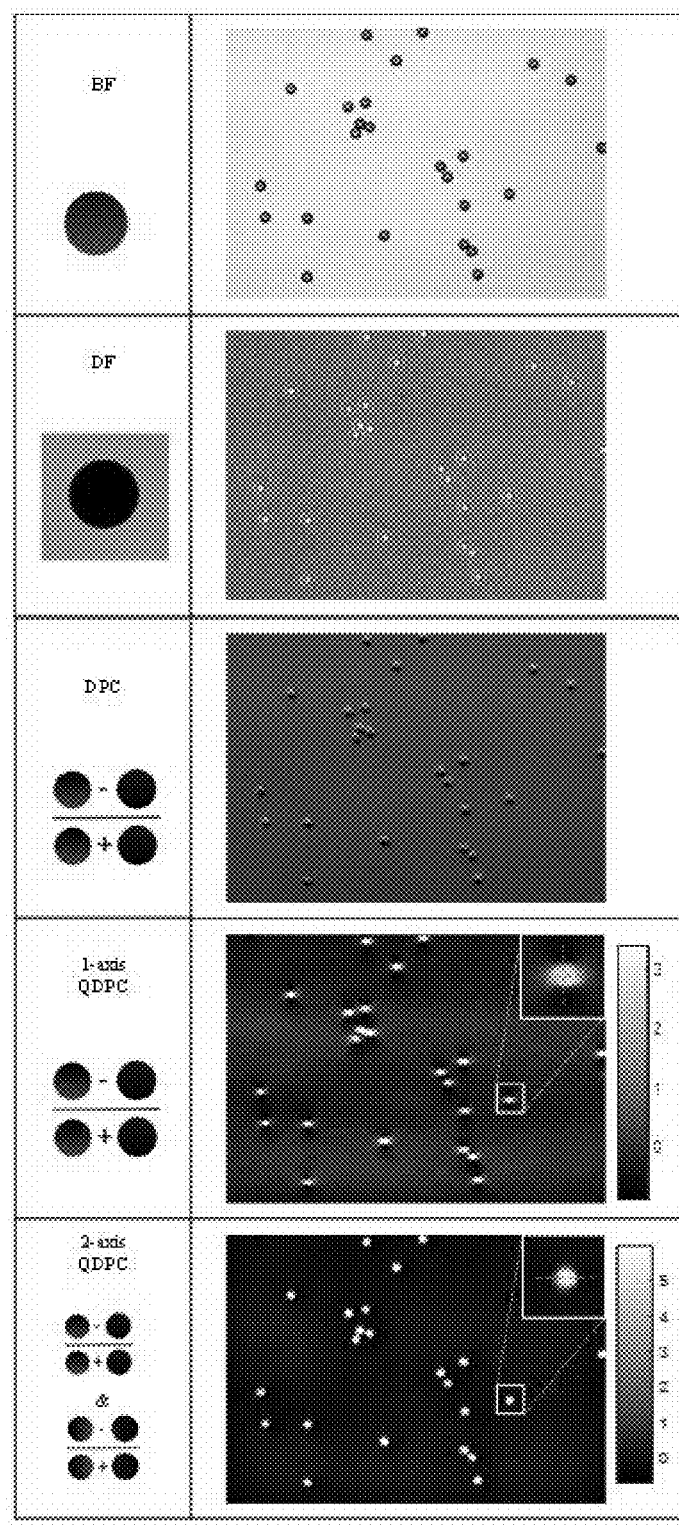
FIG. 27 shows images of microspheres using our 2-axis measurements approach.
Figure 28:
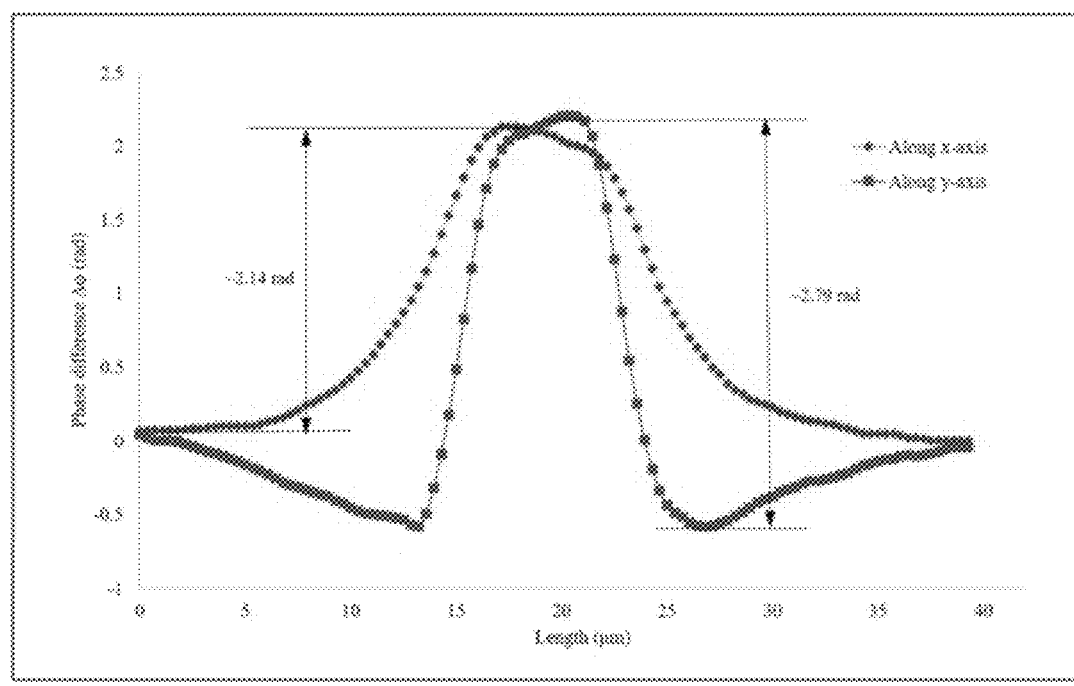
FIG. 28 shows the phase distribution along the dashed line of a zoomed-in microsphere at the highlighted box region of 1-axis QDPC image in FIG. 27.
Figure 29:
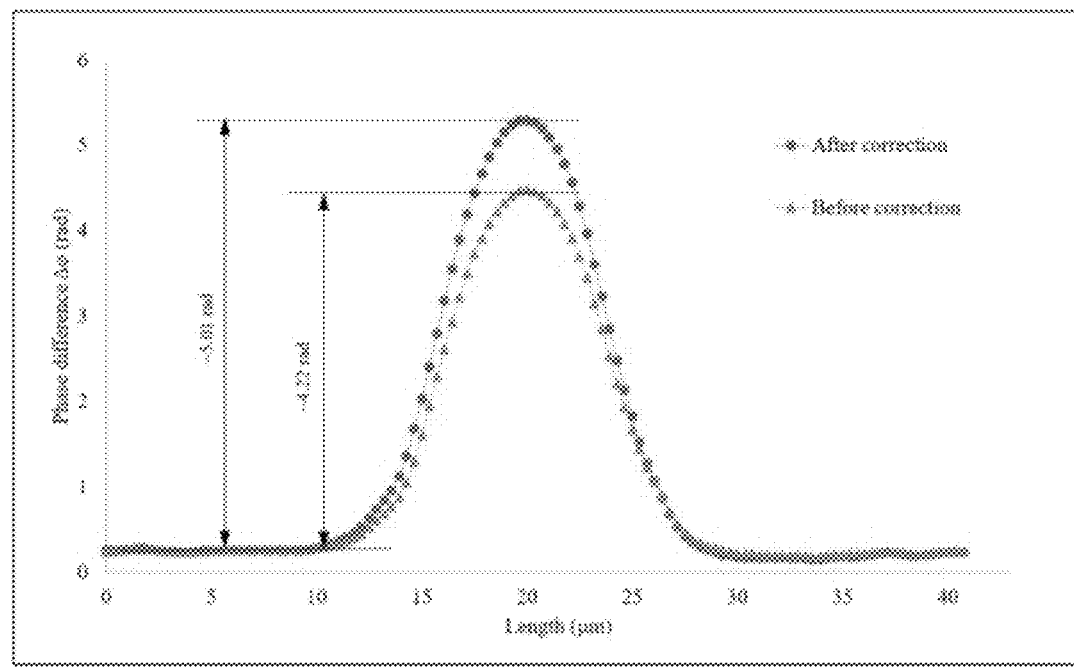
FIG. 29 shows comparison of phase distribution along the dashed line of a zoomed-in microsphere at the highlighted box region of 2-axis QDPC image before and after color leakage correction.
Figure 30:
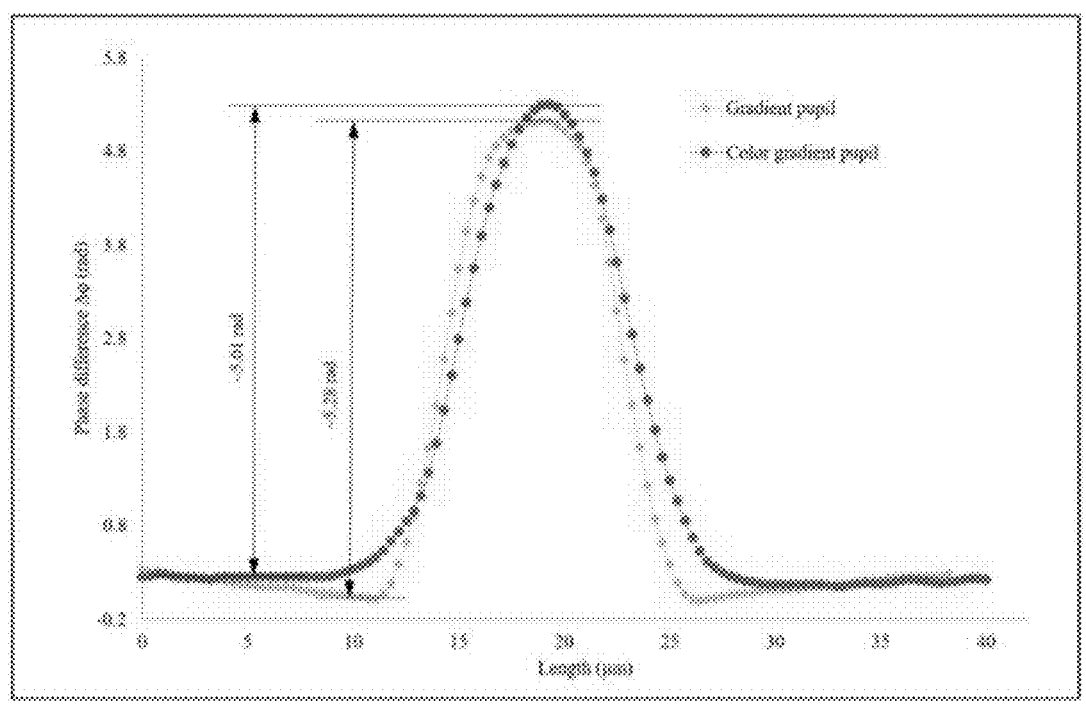
FIG. 30 shows Comparison of phase distribution along the dashed line of a zoomed-in microsphere at the highlighted box region of 2-axis QDPC image by gradient pupil and color leakage correction.
Figure 31A:
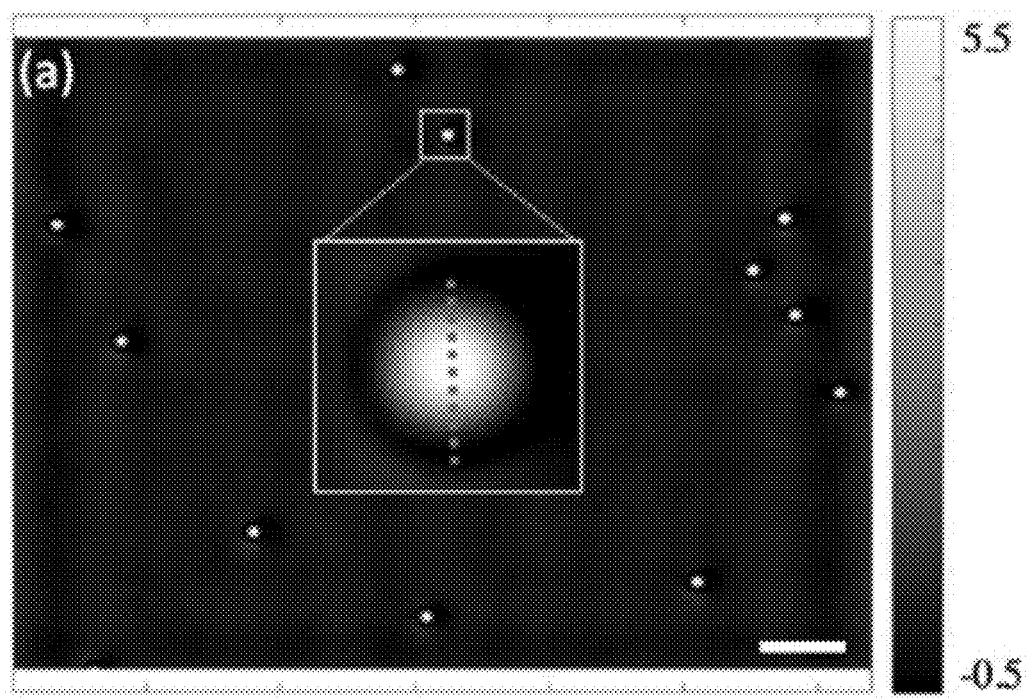
FIG. 31A shows quantitative phase image of microspheres reconstructed by the system with color leakage correction.
Figure 31B:
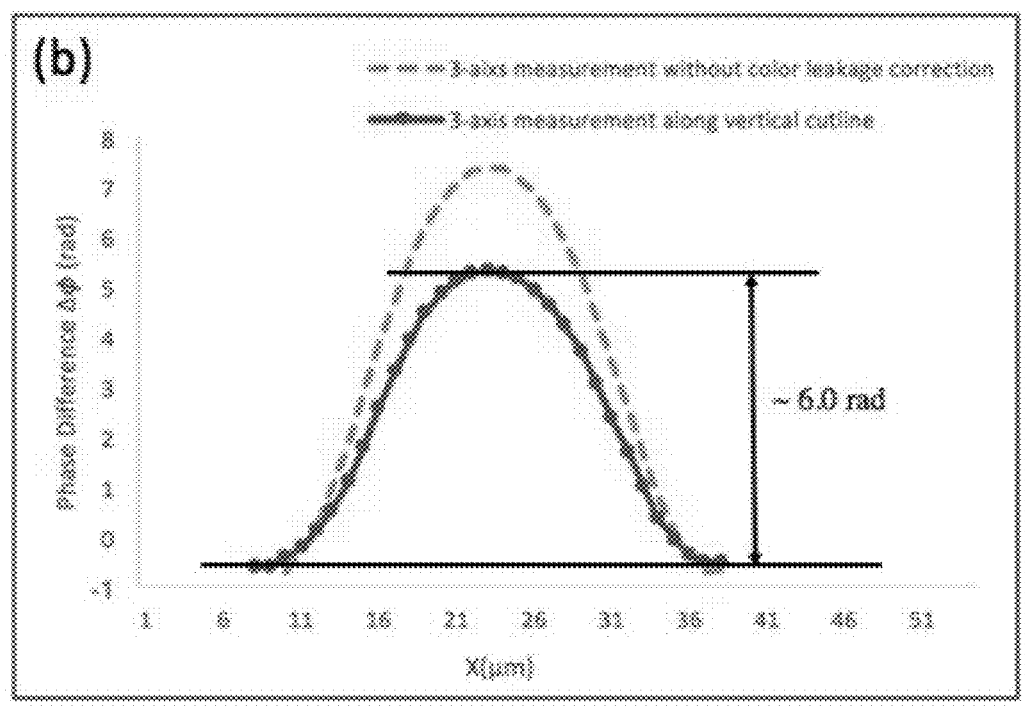
FIG. 31B shows Measured phase distribution of the cross-section along the dashed line of a zoomed-in microsphere in FIG. 31A with and without color leakage correction.
Figure 32A:
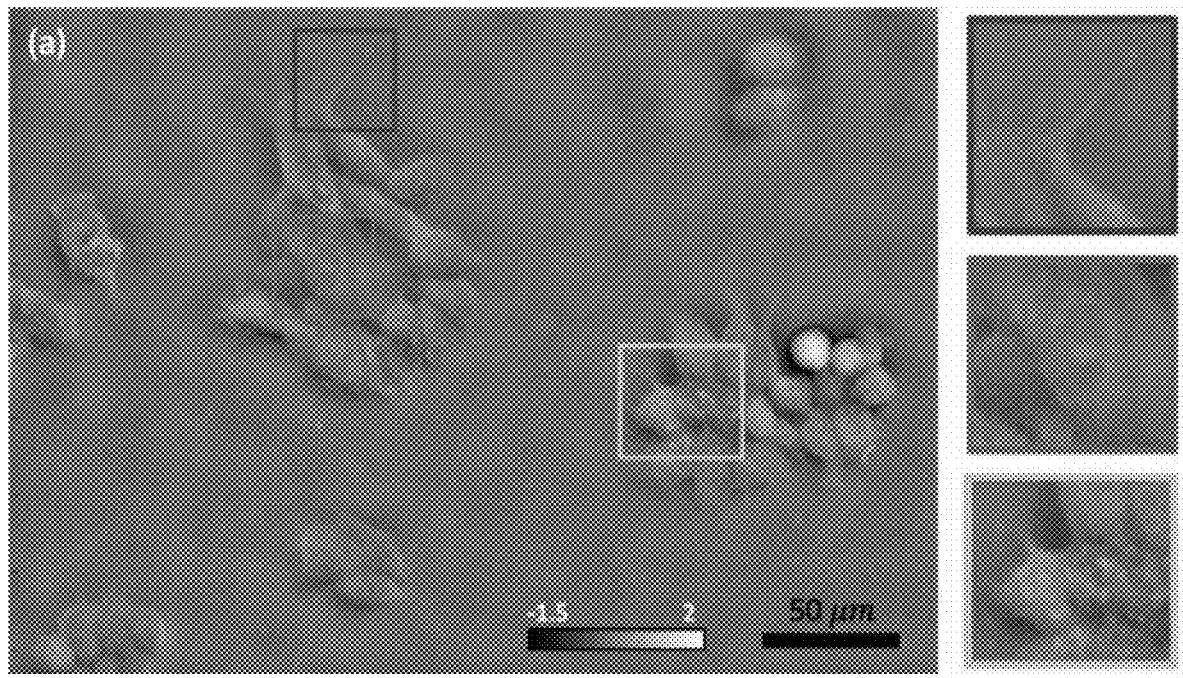
FIG. 32A and FIG. 32B show quantitative phase image of live breast cancer cells using MW-iDPC system.
Figure 32B:
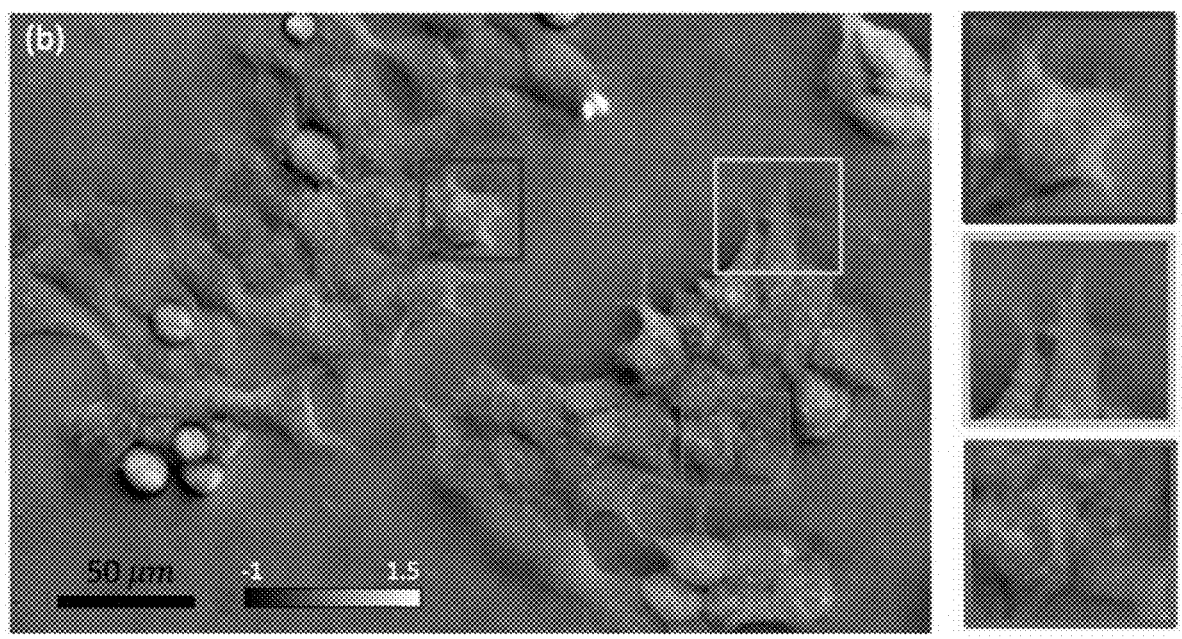
Figure 32C:
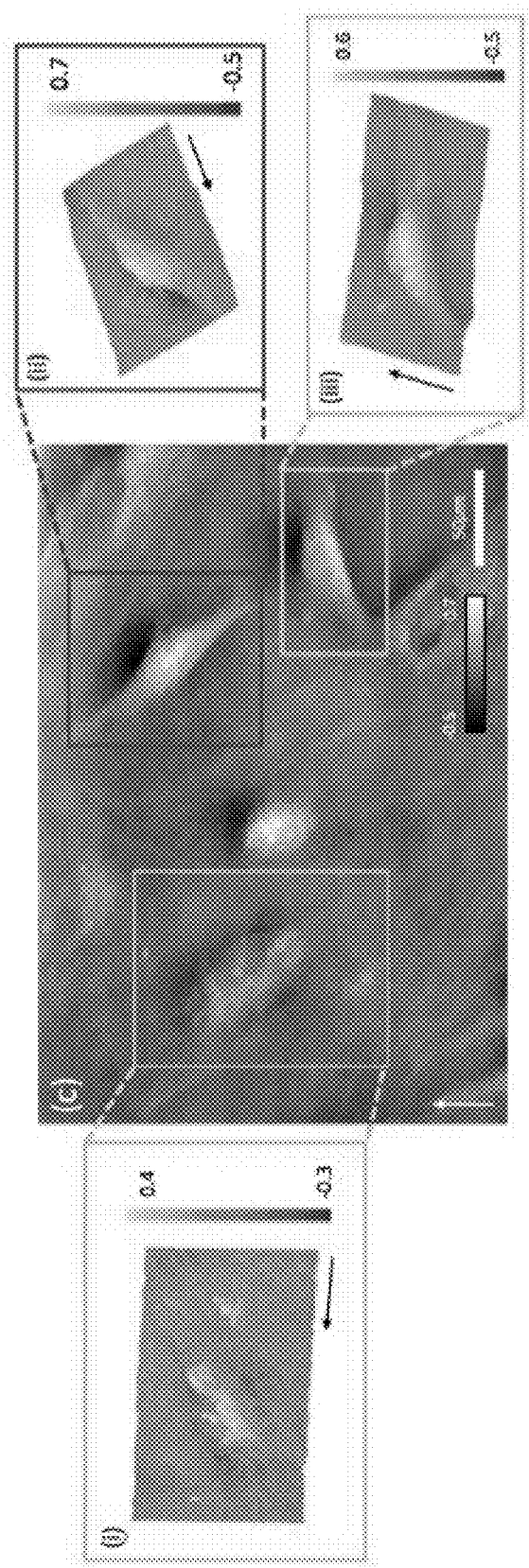
FIG. 32C shows live hair follicle dermal papilla cells with corresponding three-dimensional visualizations (i-iii) of particular cells highlighted in the solid color boxes on the reconstructed iDPC image.

FIG. 11 is a schematic diagram showing the results of surface profile measurement of microspheres by using the optical system of FIG. 8. FIG. 11(a) is an image of a plurality of microspheres. A white circular image is framed by one of the microspheres (small squares). A large square is an enlarged image. A dotted line in the enlarged square represents a section line. FIG. 11(b) shows the phase difference information distribution of the sphere position corresponding to the dotted line. The horizontal axis is the horizontal position of the microspheres in the dotted line, and the vertical axis is the phase difference. According to actual measurements, the measured phase difference is 6.0 rad, and a predicted phase difference is 6.25, thus a difference is only 4%. This is caused by an error of the size of each microsphere itself and refractive effect around the microsphere. It can be proved that the method of the present disclosure can indeed measure the phase information about the depth of the surface of the object, thereby being suitable and convenient for a surface profile reconstruction. In addition, it can be seen that the differential phase contrast calculation using three axes is more accurate than the differential phase contrast calculation using one axis.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A system for quantitative differential phase contrast microscopy with an isotropic transfer function, the system comprising:
   a light source, the light source generating an incident light field;
   a light intensity modulator, according to at least one modulation pattern generated by a controlling signal, the light intensity modulator modulating the incident light field into a detection light field, the at least one modulation pattern having a varied optical amplitude gradient along a radial direction;
   a condenser, the condenser positioned at one side of the light intensity modulator, the light intensity modulator positioned on a Fourier plane of the condenser, the condenser receiving the detection light field and refracting the detection light field to generate an off-axis light field to project to an object for generating an object light field, the off-axis light field projecting beyond a first axial direction;
   an objective lens positioned at one side of the condenser and the object positioned on a focal length of the objective lens, the object located between the condenser and the objective lens, and the objective lens receiving the object light field; and
   an image capturing module, the image capturing module coupled to the objective lens, wherein the image capturing module receives the object light field and generates an optical image corresponding to the varied optical amplitude gradient;
   wherein the light intensity modulator is a liquid crystal module (TFT shield) for controlling a light penetration intensity or a liquid crystal on silicon (LCoS), the light intensity modulator comprises a liquid crystal unit for changing an amount of light penetration and colors of the light penetration according to the controlling signal.

2. The system of claim 1, wherein the condenser has a first numerical aperture (NA) value, the objective lens has a second numerical aperture (NA) value, a ratio of the first and second NA values is in a range of a partially coherent illumination.

3. The system of claim 1, further comprising an operation processing unit, wherein the operation processing unit generates the controlling signal to control the light intensity modulator to generate the at least one modulation pattern, the at least one modulation pattern comprises a first varied optical amplitude gradient modulation pattern and a second varied optical amplitude gradient modulation pattern having at least one axial direction being a symmetry axis; wherein a first optical image and a second optical image are operated by a differential phase contrast calculation for reconstructing depth information of a surface of the object, the first optical image is captured by the image capturing module and corresponding to the first varied optical amplitude gradient modulation pattern, the second optical image is captured by the image capturing module and corresponding to the second varied optical amplitude gradient modulation pattern.

4. The system of claim 1, wherein a manner the light intensity modulator generating the varied optical amplitude gradient along the radial direction is centered on an optical axis of the incident light field with a radius of a specific-length, and along a radial of the light intensity modulator, to generate the modulation pattern having the varied optical amplitude gradient.

* * * * *